US012666046B2

(12) United States Patent
Zou et al.

(10) Patent No.: US 12,666,046 B2
(45) Date of Patent: Jun. 23, 2026

(54) METHOD, APPARATUS AND COMPUTER PROGRAM PRODUCT FOR END-TO-END LEARNED PREDICTIVE CODING OF MEDIA FRAMES

(71) Applicant: Nokia Technologies Oy, Espoo (FI)

(72) Inventors: Nannan Zou, Tampere (FI); Honglei Zhang, Tampere (FI); Francesco Cricrì, Tampere (FI); Hamed Rezazadegan Tavakoli, Espoo (FI); Ramin Ghaznavi Youvalari, Tampere (FI)

(73) Assignee: Nokia Technologies Oy, Espoo (FI)

( * ) Notice: Subject to any disclaimer, the term of this patent is extended or adjusted under 35 U.S.C. 154(b) by 194 days.

(21) Appl. No.: 18/548,130

(22) PCT Filed: Mar. 9, 2022

(86) PCT No.: PCT/IB2022/052115
§ 371 (c)(1),
(2) Date: Aug. 28, 2023

(87) PCT Pub. No.: WO2022/195409
PCT Pub. Date: Sep. 22, 2022

(65) Prior Publication Data
US 2024/0146938 A1 May 2, 2024

Related U.S. Application Data

(60) Provisional application No. 63/162,802, filed on Mar. 18, 2021.

(51) Int. Cl.
*H04N 19/159* (2014.01)
*H04N 19/172* (2014.01)

(52) U.S. Cl.
CPC ......... *H04N 19/159* (2014.11); *H04N 19/172* (2014.11)

(58) Field of Classification Search
CPC .. H04N 19/176; H04N 19/105; H04N 19/159; H04N 19/70; H04N 19/52;
(Continued)

(56) References Cited

U.S. PATENT DOCUMENTS

2015/0373346 A1* 12/2015 Wang ................... H04N 19/188
375/240.02
2016/0224833 A1* 8/2016 Jin .......................... G06T 7/246
(Continued)

OTHER PUBLICATIONS

"Video Coding For Low Bit Rate Communication", Series H: Audiovisual And Multimedia Systems, Infrastructure of audiovisual services—Coding of moving Video, ITU-T Recommendation H.263, Jan. 2005, 226 pages.
(Continued)

*Primary Examiner* — Masum Billah
(74) *Attorney, Agent, or Firm* — McCarter & English, LLP; Joseph C. Drish

(57) ABSTRACT

Various embodiments provide an apparatus, a method and a computer program product for end-to-end learned predictive coding of media frames. An example apparatus includes at least one processor; and at least one non-transitory memory including computer program code; wherein the at least one memory and the computer program code are configured to, with the at least one processor, cause the apparatus at least to perform: encode or decode one or more media frames for at least one neural network; wherein an inter-frame codec is applied to at least one media frame of the one or more media frames; and wherein a first decoded reference frame and a second decoded reference frame refer to reference frames for the at least one media frame.

18 Claims, 20 Drawing Sheets

(58) Field of Classification Search
 CPC .... H04N 19/593; H04N 19/132; H04N 19/44;
  H04N 19/61; H04N 19/172; H04N
  19/597; H04N 19/42; H04N 19/30; H04N
  19/124; H04N 19/503; H04N 19/91
 USPC ......................................................... 375/240
 See application file for complete search history.

(56) References Cited

U.S. PATENT DOCUMENTS

| | | | |
|---|---|---|---|
| 2019/0306526 A1 * | 10/2019 | Cho ..................... | H04N 19/109 |
| 2021/0281867 A1 * | 9/2021 | Golinski .............. | H04N 19/137 |
| 2022/0156584 A1 * | 5/2022 | Fersch .................... | G10L 19/00 |

OTHER PUBLICATIONS

"Advanced Video Coding For Generic Audiovisual services", Series H: Audiovisual And Multimedia Systems, Infrastructure of audiovisual services—Coding of moving Video, Recommendation ITU-T H.264, Apr. 2017, 812 pages.
"High Efficiency Video Coding", Series H: Audiovisual And Multimedia Systems, Infrastructure of audiovisual services—Coding of moving video, Recommendation ITU-T H.265, Feb. 2018, 692 pages.
"Versatile Video Coding", Series H: Audiovisual and Multimedia Systems Infrastructure of audiovisual services—Coding of moving video, Recommendation ITU-T H.266, Aug. 2020, 516 pages.
"Versatile supplemental enhancement information messages for coded video bitstreams", Series H: Audiovisual and Multimedia Systems Infrastructure of audiovisual services—Coding of moving video, Recommendation ITU-T H.274, Aug. 2020, 86 pages.
Lin et al., "M-LVC: Multiple Frames Prediction for Learned Video Compression", arXiv, Apr. 21, 2020, 14 pages.
Yang et al., "Learning for Video Compression with Recurrent Auto-Encoder and Recurrent Probability Model", arXiv, Jun. 29, 2020, 15 pages.
Yang et al., "Learning for Video Compression with Hierarchical Quality and Recurrent Enhancement", arXiv, Apr. 8, 2020, pp. 1-14.

Liu et al., "Neural Video Coding Using Multiscale Motion Compensation and Spatiotemporal Context Model", arXiv, Jul. 9, 2020, pp. 1-14.
Fischer et al., "FlowNet: Learning Optical Flow with Convolutional Networks", arXiv, May 4, 2015, 13 pages.
"Information Technology—Generic Coding of Moving Pictures and Associated Audio Information: Systems", Series H: Audiovisual and Multimedia Systems, Infrastructure of Audiovisual Services—Transmission Multiplexing and Synchronization, Recommendation ITU-T H.222.0, Mar. 2017, 291 pages.
"Information technology—Generic coding of moving pictures and associated audio information: Video", Series H: Audiovisual and Multimedia Systems Infrastructure of audiovisual services—Coding of moving video, ITU-T Recommendation H.262, Feb. 2000, 220 pages.
"Information technology—Universal coded character set (UCS)", ISO/IEC 10646, Sixth edition, Dec. 2020, 9 pages.
"IEEE 802.11", Wikipedia, Retrieved on Sep. 24, 2023, Webpage available at : https://en.wikipedia.org/wiki/IEEE_802.11.
"Information Technology—Coding Of Audio-Visual Objects—Part 12: ISO Base Media File Format", ISO/IEC 14496-12, Fifth edition, Dec. 15, 2015, 248 pages.
"Information Technology—Coding Of Audio-Visual Objects—Part 15: Advanced Video Coding (AVC) File Format", ISO/IEC 14496-15, First edition, Apr. 15, 2004, 29 pages.
International Search Report and Written Opinion received for corresponding Patent Cooperation Treaty Application No. PCT/IB2022/052115, dated Jun. 15, 2022, 18 pages.
Zou et al., "End-to-End Learning for Video Frame Compression with Self-Attention", IEEE/CVF Conference on Computer Vision and Pattern Recognition Workshops (CVPRW), 2020, pp. 580-584.
Park et al., "Deep Predictive Video Compression Using Mode-Selective Uni-and Bi-Directional Predictions Based on Multi-Frame Hypothesis", IEEE Access, vol. 9, Dec. 21, 2020, pp. 72-85.
Laude et al., "HEVC Inter Coding using Deep Recurrent Neural Networks and Artificial Reference Pictures", Picture Coding Symposium (PCS), Nov. 12-15, 2019, 5 pages.
Zou et al., "Learned Video Compression with Intra-Guided Enhancement and Implicit Motion Information", IEEE/CVF Conference on Computer Vision and Pattern Recognition Workshops (CVPRW), Jun. 19-25, 2021, pp. 1870-1874.

* cited by examiner

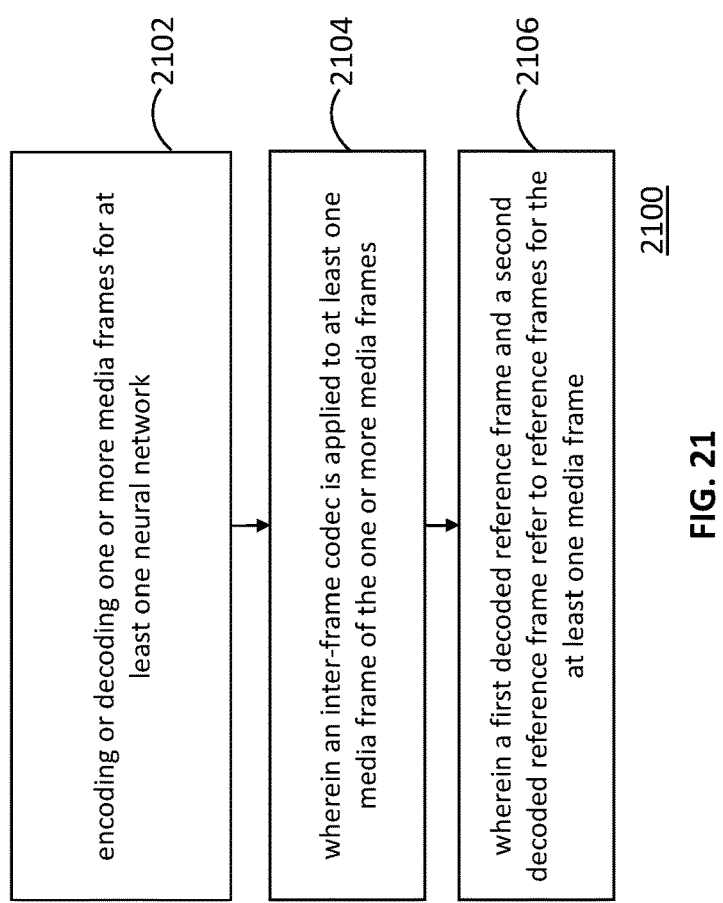

encoding or decoding one or more media frames for at least one neural network — 2102 wherein an inter-frame codec is applied to at least one media frame of the one or more media frames — 2104 wherein a first decoded reference frame and a second decoded reference frame refer to reference frames for the at least one media frame — 2106

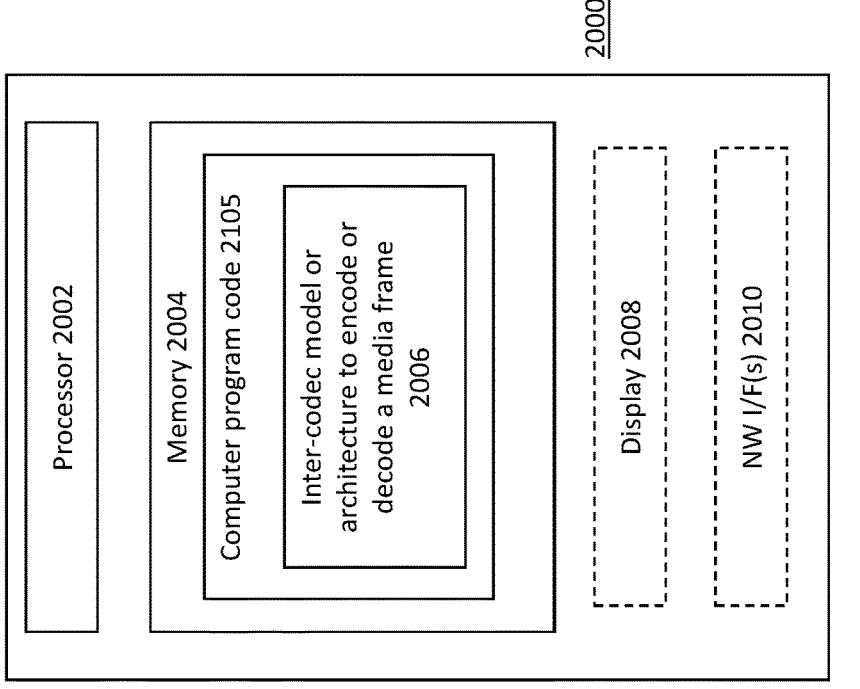

Processor 2002

Memory 2004

Computer program code 2105

Inter-codec model or architecture to encode or decode a media frame 2006

Display 2008

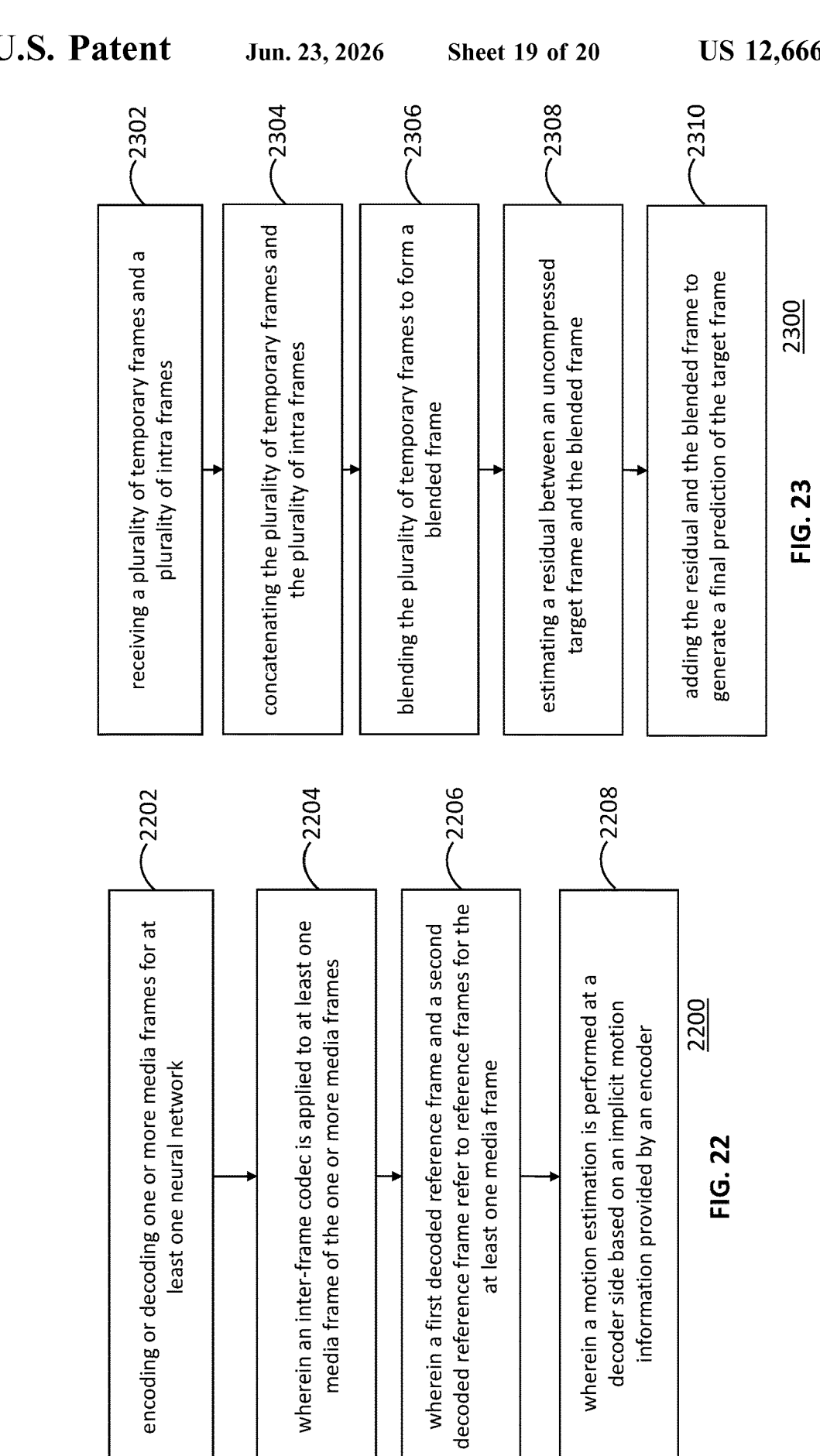

2302 — receiving a plurality of temporary frames and a plurality of intra frames 2304 — concatenating the plurality of temporary frames and the plurality of intra frames 2306 — blending the plurality of temporary frames to form a blended frame 2308 — estimating a residual between an uncompressed target frame and the blended frame 2310 — adding the residual and the blended frame to generate a final prediction of the target frame

2202 — encoding or decoding one or more media frames for at least one neural network 2204 — wherein an inter-frame codec is applied to at least one media frame of the one or more media frames 2206 — wherein a first decoded reference frame and a second decoded reference frame refer to reference frames for the at least one media frame 2208 — wherein a motion estimation is performed at a decoder side based on an implicit motion information provided by an encoder

METHOD, APPARATUS AND COMPUTER PROGRAM PRODUCT FOR END-TO-END LEARNED PREDICTIVE CODING OF MEDIA FRAMES

RELATED APPLICATION

This application claims priority to PCT Application No. PCT/IB2022/052115, filed on Mar. 9, 2022, which claims priority to U.S. Provisional Application No. 63/162,802, filed on Mar. 18, 2021, each of which is incorporated herein by reference in its entirety.

SUPPORT STATEMENT

The project leading to this application has received funding from the ECSEL Joint Undertaking (JU) under grant agreement No 876019. The JU receives support from the European Union's Horizon 2020 research and innovation programme and Germany, Netherlands, Austria, Romania, France, Sweden, Cyprus, Greece, Lithuania, Portugal, Italy, Finland, Turkey

TECHNICAL FIELD

The examples and non-limiting embodiments relate generally to multimedia transport and neural networks, and more particularly, to method, apparatus and computer program product for end-to-end learned predictive coding of media frames.

BACKGROUND

It is known to provide standardized formats for exchange of neural networks.

SUMMARY

An example apparatus includes at least one processor; and at least one non-transitory memory including computer program code; wherein the at least one memory and the computer program code are configured to, with the at least one processor, cause the apparatus at least to perform: encode or decode one or more media frames for at least one neural network; wherein an inter-frame codec is applied to at least one media frame of the one or more media frames; and wherein a first decoded reference frame and a second decoded reference frame refer to reference frames for the at least one media frame.

The example apparatus may further include an inter-frame encoder neural network (NN) block or circuit, wherein the inter-frame encoder block or circuit is caused to apply the inter-frame codec to the at least one frame.

The example apparatus may further include a quantization block or circuit to perform a quantization operation on the at least one media frame to output a quantized latent representation of the at least one media frame.

The example apparatus may further include a dequantization block or circuit to perform a dequantization operation on the quantized latent representation of the at least one media frame, wherein the dequantization operation comprises an inverse or a substantially inverse operation of the quantization operation, and wherein the output of the dequantization block or circuit comprises a dequantized latent representation of the quantized latent representation.

The example apparatus may further include an inter-frame decoder NN block or circuit to generate a decoded reconstructed frame based on the dequantized latent representation.

The example apparatus may further include, wherein the decoded or reconstructed frame comprises similar data distribution as an input frame to an intra-codec.

The example apparatus may further include, wherein the decoded or reconstructed frame comprises similar data distribution different from an input frame to an intra-codec.

The example apparatus may further include an entropy encoder for inter block or circuit to output a bitstream, comprising a compressed version of the at least one media frame, based on the quantized latent representation of the at least one frame.

The example apparatus may further include an entropy decoder for inter block or circuit to output a decoded quantized latent representation based on the bitstream.

The example apparatus may further include a probability model for inter block or circuit to output a probability estimate for one or more elements of the quantized latent representation or a portability estimate for one or more elements of the decoded quantized latent representation.

The example apparatus may further include, wherein the probability estimate for the one or more elements of the quantized latent representation is provided to the entropy encoder for inter block or circuit for encoding, and wherein the probability estimate for the one or more elements of the decoded quantized latent representation is provided to the entropy decoder for inter block or circuit for decoding.

The example apparatus may further include one or more feature pyramid net blocks or circuits to generate a first set of multi-scale features based on the first reference frame, the second reference frame, and the at least one media frame.

The example apparatus may further include a bridge net block or circuit to aggregate and convert the multi-scale features to the latent representation based on the first reference frame, the second reference frame, and the at least one media frame.

The example apparatus may further include an entropy block or circuit to quantize, compress and convert the latent representation to a compressed bitstream of the latent representation.

The example apparatus may further include at least one entropy feature pyramid net block or circuit to generate one or more features from the first and the second reference frames, wherein the one or more features are used by the entropy block or circuit to enhance a context for a probability distribution estimation of the latent representation.

The example apparatus may further include, wherein the entropy block or circuit is further caused to decompress and dequantize the compressed bitstream of the latent representation to generate a reconstruction of the latent representation.

The example apparatus may further include a feature pyramid decoder, wherein the feature pyramid decoder is caused to generate a second set of multi-scale features and a residual output based on the reconstructed latent representation.

The example apparatus may further include one or more motion estimation blocks or circuits, wherein the one or more motion estimation blocks or circuits are caused to estimate motion based on the first set of multi-scale features and the second set of multi-scale features, and wherein the apparatus is further caused to implicitly embed motion estimation information to the reconstructed latent representation.

The example apparatus may further include one or more frame prediction blocks or circuits, wherein the one or more frame prediction blocks or circuits are caused to use the motion estimation information to warp the first reference frame to generate a first prediction of the target media frame and the second reference frame to generate a second prediction of the target media frame.

The example apparatus may further include a concatenation block or circuit to concatenate the first prediction of the target media frame and the second prediction of the target media frame.

The example apparatus may further include a combiner block or circuit, wherein the combiner block or circuit is caused to generate a final prediction of the target media frame based on the concatenated first prediction of the target media frame and the second prediction of the target media frame.

The example apparatus may be further caused to add the residual output to the final prediction of the target media frame to generate a final reconstructed target media frame.

The example apparatus may further include, wherein the combiner block or circuit is further caused to combine at least one of: at least one intra frame or at least one latent representation of the at least one intra frame with the concatenated first prediction of the target media frame and the second prediction of the target media frame to generate the final prediction of the target media frame.

The example apparatus may further include a combiner block or circuit, wherein the combiner block or circuit is caused to combine the first prediction of the target media frame and the second prediction of the target media frame to generate a final prediction of the target media frame.

The example apparatus may further include a combiner block or circuit, wherein the combiner block or circuit is further caused to combine two reconstructed intra-coded frames with the first prediction of the target media frame and the second prediction of the target media frame to generate the final prediction of the target media frame.

The example apparatus may further include, wherein the intra-frame period is at least one of a predetermined integer or a predefined integer.

The example apparatus may be further caused to determine the intra-frame period based on an adaptive process.

The example apparatus may further include, wherein the intra-frame codec period is not constant.

The example apparatus may further include, wherein intra-frame codec period comprises a frequency for applying intra-frame coding to a frame.

The example apparatus may further include, wherein the at least one media frame comprises an index 'i' that is not a multiple of an intra-frame codec period.

The example apparatus may further include, wherein the first decoded reference frame comprises an index 'i−k' and the second decoded reference frame comprises an index 'i+m'.

The example apparatus may further include, wherein 'i', 'k', and 'm' comprises integer numbers, and wherein 'k' and 'm' are selected based on a temporal level of a bidirectionally predicted frame with the index 'i'.

The example apparatus may further include, wherein the first and the second reference frames comprise one of an intra frame, a bidirectionally predicted frame, or a unidirectionally predicted frame.

The example apparatus may further include, wherein the inter-frame codec is trained using a training data set and a training algorithm.

The example apparatus may further include, wherein the one or more media frame comprises one or more video frames.

The example apparatus is further caused to reset a hidden state of the at least one neural network, based on a comparison of a distance of the at least one media frame with a holistic representation of last encoded media frame, when the at least one neural network comprises a recurrent neural network (RNN).

An another example apparatus includes at least one processor; and at least one non-transitory memory including computer program code; wherein the at least one memory and the computer program code are configured to, with the at least one processor, cause the apparatus at least to perform: receive a plurality of temporary frames and a plurality of intra frames; concatenate the plurality of temporary frames and the plurality of intra frames; blend the plurality of temporary frames to form a blended frame; estimate a residual between an uncompressed target frame and the blended frame; and add the residual and the blended frame to generate a final prediction of the target frame.

An example method includes encoding or decoding one or more media frames for at least one neural network; wherein an inter-frame codec is applied to at least one media frame of the one or more media frames; and wherein a first decoded reference frame and a second decoded reference frame refer to reference frames for the at least one media frame.

The example method may further include performing a quantization operation on the at least one media frame to output a quantized latent representation of the at least one media frame.

The example method may further include performing a dequantization operation on the quantized latent representation of the at least one media frame, wherein the dequantization operation comprises an inverse or a substantially inverse operation of the quantization operation, and wherein the output of the dequantization block or circuit comprises a dequantized latent representation of the quantized latent representation.

The example method may further include generating a decoded reconstructed frame based on the dequantized latent representation.

The example may further include, wherein the decoded or reconstructed frame comprises a similar data distribution as an input frame to an intra-codec.

The example method may further include, wherein the decoded or reconstructed frame comprises a data distribution that is different from an input frame to an intra-codec.

The example method may further include providing a bitstream as an output, wherein the bitstream comprises a compressed version of the at least one media frame, based on the quantized latent representation of the at least one frame.

The example method may further include providing a decoded quantized latent representation based on the bitstream as an output.

The example method may further include providing a probability estimate for one or more elements of the quantized latent representation or a portability estimate for one or more elements of the decoded quantized latent representation as an output.

The example method may further include, wherein the probability estimate for the one or more elements of the quantized latent representation is provided to an entropy encoder for inter block or circuit for encoding, and wherein the probability estimate for the one or more elements of the decoded quantized latent representation is provided to an entropy decoder for inter block or circuit for decoding.

The example method may further include generating a first set of multi-scale features based on the first reference frame, the second reference frame, and the at least one media frame.

The example method may further include aggregating and converting the multi-scale features to the latent representation based on the first reference frame, the second reference frame, and the at least one media frame.

The example method may further include compressing and converting the latent representation to a compressed bitstream of the latent representation.

The example method may further include generating one or more features from the first and the second reference frames, wherein the one or more features are used to enhance a context for a probability distribution estimation of the latent representation.

The example method may further include decompressing and dequantizing the compressed bitstream of the latent representation to generate a reconstruction of the latent representation.

The example method may further include generating a second set of multi-scale features and a residual output based on the reconstructed latent representation.

The example method may further include estimating motion based on the first set of multi-scale features and the second set of multi-scale features; and implicitly embedding motion estimation information to the reconstructed latent representation.

The example method may further include using the motion estimation information to warp the first reference frame to generate a first prediction of the target media frame and the second reference frame to generate a second prediction of the target media frame.

The example method may further include concatenating the first prediction of the target media frame and the second prediction of the target media frame.

The example method may further include generating a final prediction of the target media frame based on the concatenated first prediction of the target media frame and the second prediction of the target media frame.

The example method may further include combining at least one of: at least one intra frame or at least one latent representation of the at least one intra frame with the concatenated first prediction of the target media frame and the second prediction of the target media frame to generate the final prediction of the target media frame.

The example method may further include combining the first prediction of the target media frame and the second prediction of the target media frame to generate a final prediction of the target media frame.

The example method may further include combining one or more reconstructed intra-coded frames with the first prediction of the target media frame and the second prediction of the target media frame to generate the final prediction of the target media frame.

The example method may further include, wherein the intra-frame period is at least one of a predetermined integer or a predefined integer.

The example method may further include determining the intra-frame period based on an adaptive process.

The example method may further include, wherein the intra-frame codec period is not constant.

The example method may further include, wherein intra-frame codec period comprises a frequency for applying intra-frame coding to a frame.

The example method may further include, wherein the at least one media frame comprises an index 'i' that is not a multiple of an intra-frame codec period.

The example method may further include, wherein the first decoded reference frame comprises an index 'i–k' and the second decoded reference frame comprises an index 'i+m'.

The example method may further include, wherein 'i', 'k', and 'm' comprises integer numbers, and wherein 'k' and 'm' are selected based on a temporal level of a bidirectionally predicted frame with the index 'i'.

The example method may further include, wherein the first and the second reference frames comprise one of an intra frame, a bidirectionally predicted frame, or a unidirectionally predicted frame.

The example method may further include, wherein the inter-frame codec is trained using a training data set and a training algorithm.

The example method may further include, wherein the one or more media frame comprises one or more video frames.

The example method may further include resetting a hidden state of the at least one neural network, based on a comparison of a distance of the at least one media frame with a holistic representation of last encoded media frame, when the at least one neural network comprises a recurrent neural network (RNN).

Another example method includes receiving a plurality of temporary frames and a plurality of intra frames; concatenating the plurality of temporary frames and the plurality of intra frames; blending the plurality of temporary frames to form a blended frame; estimating a residual between an uncompressed target frame and the blended frame; and adding the residual and the blended frame to generate a final prediction of the target frame.

An example computer readable medium includes program instructions for causing an apparatus to perform at least the following: encoding or decode one or more media frames for at least one neural network; wherein an inter-frame codec is applied to at least one media frame of the one or more media frames; and wherein a first decoded reference frame and a second decoded reference frame refer to reference frames for the at least one media frame.

The example computer readable medium may further include, wherein the computer readable medium comprises a non-transitory computer readable.

Another example computer readable medium includes program instructions for causing an apparatus to perform at least the following: receiving a plurality of temporary frames and a plurality of intra frames; concatenating the plurality of temporary frames and the plurality of intra frames; blending the plurality of temporary frames to form a blended frame; estimating a residual between an uncompressed target frame and the blended frame; and adding the residual and the blended frame to generate a final prediction of the target frame.

The example computer readable medium may further include, wherein the computer readable medium comprises a non-transitory computer readable.

A yet another example apparatus includes at least one processor; and at least one non-transitory memory including computer program code; wherein the at least one memory and the computer program code are configured to, with the at least one processor, cause the apparatus at least to perform: encode or decode one or more media frames for at least one neural network; wherein an inter-frame codec is applied to at least one media frame of the one or more media frames; wherein a first decoded reference frame and a second decoded reference frame refer to reference frames for the at least one media frame; and wherein a motion estimation is performed at a decoder side based on an implicit motion information provided by an encoder.

A yet another example method includes encoding or decoding one or more media frames for at least one neural network; wherein an inter-frame codec is applied to at least one media frame of the one or more media frames; wherein a first decoded reference frame and a second decoded reference frame refer to reference frames for the at least one media frame; and wherein a motion estimation is performed at a decoder side based on an implicit motion information provided by an encoder.

BRIEF DESCRIPTION OF THE DRAWINGS

The foregoing aspects and other features are explained in the following description, taken in connection with the accompanying drawings, wherein:

FIG. 20 is an example apparatus, which may be implemented in hardware, configured to implement inter-codec model or architecture to encode or decode a media frame, in accordance with an embodiment.

FIG. 21 illustrates an example method for encoding or decoding one or more media frames for at least one neural network, in accordance with an embodiment.

FIG. 22 illustrates another example method for encoding or decoding one or more media frames for at least one neural network, in accordance with another embodiment.

FIG. 23 illustrates yet another example method for encoding or decoding one or more media frames for at least one neural network, in accordance with yet another embodiment.

DETAILED DESCRIPTION OF EXAMPLE EMBODIMENTS

Figure 2:
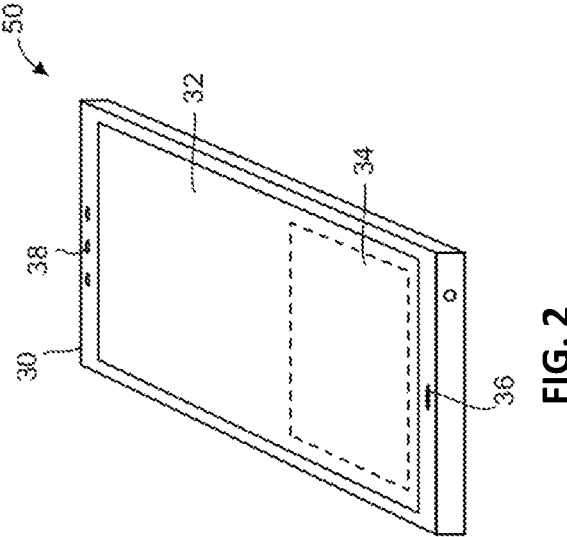
FIG. 2 shows schematically a user equipment suitable for employing embodiments of the examples described herein.

The following acronyms and abbreviations that may be found in the specification and/or the drawing figures are defined as follows:

| | |
|---|---|
| 3GP | 3GPP file format |
| 3GPP | 3rd Generation Partnership Project |
| 3GPP TS | 3GPP technical specification |
| 4CC | four character code |
| 4G | fourth generation of broadband cellular network technology |
| 5G | fifth generation cellular network technology |
| 5GC | 5G core network |
| ACC | accuracy |
| AI | artificial intelligence |
| AIoT | AI-enabled IoT |
| a.k.a. | also known as |
| AMF | access and mobility management function |
| AVC | advanced video coding |
| CABAC | context-adaptive binary arithmetic coding |
| CDMA | code-division multiple access |
| CE | core experiment |
| CU | central unit |
| DASH | dynamic adaptive streaming over HTTP |
| DCT | discrete cosine transform |
| DSP | digital signal processor |
| DU | distributed unit |
| eNB (or eNodeB) | evolved Node B (for example, an LTE base station) |
| EN-DC | E-UTRA-NR dual connectivity |
| en-gNB or En-gNB | node providing NR user plane and control plane protocol terminations towards the UE, and acting as secondary node in EN-DC |
| E-UTRA | evolved universal terrestrial radio access, for example, the LTE radio access technology |
| FDMA | frequency division multiple access |
| f(n) | fixed-pattern bit string using n bits written (from left to right) with the left bit first. |
| F1 or F1-C | interface between CU and DU control interface |
| gNB (or gNodeB) | base station for 5G/NR, for example, a node providing NR user plane and control plane protocol terminations towards the UE, and connected via the NG interface to the 5GC |
| GSM | Global System for Mobile communications |
| H.222.0 | MPEG-2 Systems is formally known as ISO/IEC 13818-1 and as ITU-T Rec. H.222.0 |
| H.26x | family of video coding standards in the domain of the ITU-T |
| HLS | high level syntax |
| IBC | intra block copy |

-continued

| | |
|---|---|
| ID | identifier |
| IEC | International Electrotechnical Commission |
| IEEE | Institute of Electrical and Electronics Engineers |
| I/F | interface |
| IMD | integrated messaging device |
| IMS | instant messaging service |
| IoT | internet of things |
| IP | internet protocol |
| ISO | International Organization for Standardization |
| ISOBMFF | ISO base media file format |
| ITU | International Telecommunication Union |
| ITU-T | ITU Telecommunication Standardization Sector |
| LTE | long-term evolution |
| LZMA | Lempel-Ziv-Markov chain compression |
| LZMA2 | simple container format that can include both uncompressed data and LZMA data |
| LZO | Lempel-Ziv-Oberhumer compression |
| LZW | Lempel-Ziv-Welch compression |
| MAC | medium access control |
| mdat | MediaDataBox |
| MME | mobility management entity |
| MMS | multimedia messaging service |
| moov | MovieBox |
| MP4 | file format for MPEG-4 Part 14 files |
| MPEG | moving picture experts group |
| MPEG-2 | H.222/H.262 as defined by the ITU |
| MPEG-4 | audio and video coding standard for ISO/IEC 14496 |
| MSB | most significant bit |
| NAL | network abstraction layer |
| NDU | NN compressed data unit |
| ng or NG | new generation |
| ng-eNB or NG-eNB | new generation eNB |
| NN | neural network |
| NNEF | neural network exchange format |
| NNR | neural network representation |
| NR | new radio (5G radio) |
| N/W or NW | network |
| ONNX | Open Neural Network eXchange |
| PB | protocol buffers |
| PC | personal computer |
| PDA | personal digital assistant |
| PDCP | packet data convergence protocol |
| PHY | physical layer |
| PID | packet identifier |
| PLC | power line communication |
| PSNR | peak signal-to-noise ratio |
| RAM | random access memory |
| RAN | radio access network |
| RFC | request for comments |
| RFID | radio frequency identification |
| RLC | radio link control |
| RRC | radio resource control |
| RRH | remote radio head |
| RU | radio unit |
| Rx | receiver |
| SDAP | service data adaptation protocol |
| SGD | stochastic gradient descent |
| SGW | serving gateway |
| SMF | session management function |
| SMS | short messaging service |
| st(v) | null-terminated string encoded as UTF-8 characters as specified in ISO/IEC 10646 |
| SVC | scalable video coding |
| S1 | interface between eNodeBs and the EPC |
| TCP-IP | transmission control protocol-internet protocol |
| TDMA | time divisional multiple access |
| trak | TrackBox |
| TS | transport stream |
| TV | television |
| Tx | transmitter |
| UE | user equipment |
| ue(v) | unsigned integer Exp-Golomb-coded syntax element with the left bit first |
| UICC | Universal Integrated Circuit Card |

-continued

| | |
|---|---|
| UMTS | Universal Mobile Telecommunications System |
| u(n) | unsigned integer using n bits |
| UPF | user plane function |
| URI | uniform resource identifier |
| URL | uniform resource locator |
| UTF-8 | 8-bit Unicode Transformation Format |
| VCM | video coding for machines |
| WLAN | wireless local area network |
| X2 | interconnecting interface between two eNodeBs in LTE network |
| Xn | interface between two NG-RAN nodes |

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms 'data,' 'content,' 'information,' and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a 'computer-readable storage medium,' which refers to a non-transitory physical storage medium (e.g., volatile or non-volatile memory device), can be differentiated from a 'computer-readable transmission medium,' which refers to an electromagnetic signal.

A method, apparatus and computer program product are provided in accordance with an example embodiment in order to implement inter-codec model or architecture to encode or decode a media frame. Inter-codec, or inter-frame codec, is a codec (encoder-decoder) for video frames, that uses one or more other frames at the encoder side and/or at the decoder side. It may consist of two parts: an encoder, which encodes or compresses input data into a bitstream, and a decoder, which decodes or decompresses the bitstream into decompressed data.

Figure 1:
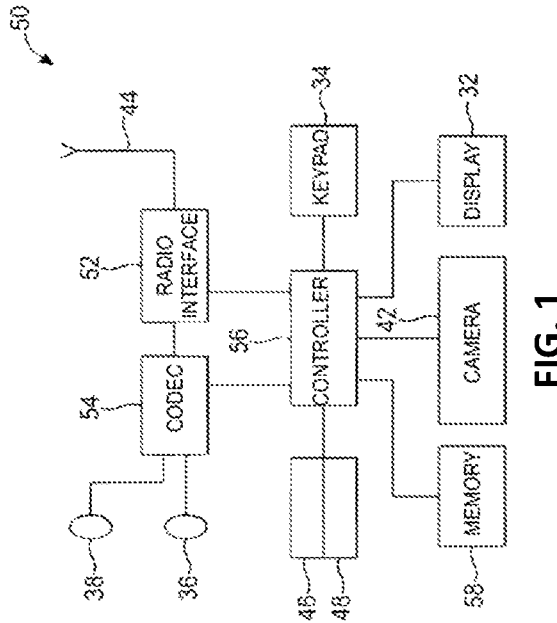
FIG. 1 shows schematically an electronic device employing embodiments of the examples described herein.

The following describes in detail suitable apparatus and possible mechanisms for implementing inter-codec model or architecture to encode or decode a media frame. In this regard reference is first made to FIG. 1 and FIG. 2, where FIG. 1 shows an example block diagram of an apparatus 50. The apparatus may be an Internet of Things (IoT) apparatus configured to perform various functions, for example, gathering information by one or more sensors, receiving or transmitting information, analyzing information gathered or received by the apparatus, or the like. The apparatus may comprise a video coding system, which may incorporate a codec. FIG. 2 shows a layout of an apparatus according to an example embodiment. The elements of FIG. 1 and FIG. 2 will be explained next.

The electronic device 50 may for example be a mobile terminal or user equipment of a wireless communication system, a sensor device, a tag, or a lower power device. However, it would be appreciated that embodiments of the examples described herein may be implemented within any electronic device or apparatus which may process data by neural networks.

The apparatus 50 may comprise a housing 30 for incorporating and protecting the device. The apparatus 50 may further comprise a display 32, e.g., in the form of a liquid crystal display, light emitting diode display, organic light emitting diode display, and the like. In other embodiments of the examples described herein the display may be any suitable display technology suitable to display media or multimedia content, for example, an image or a video. The apparatus 50 may further comprise a keypad 34. In other embodiments of the examples described herein any suitable data or user interface mechanism may be employed. For example, the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the examples described herein may be any one of: an earpiece 38, speaker, or an analogue audio or digital audio output connection. The apparatus 50 may also comprise a battery (or in other embodiments of the examples described herein the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short-range communication solution such as for example a Bluetooth wireless connection or a USB/firewire wired connection.

The apparatus 50 may comprise a controller 56, a processor or a processor circuitry for controlling the apparatus 50. The controller 56 may be connected to a memory 58 which in embodiments of the examples described herein may store both data in the form of an image, audio data, video data and/or may also store instructions for implementation on the controller 56. The controller 56 may further be connected to codec circuitry 54 suitable for carrying out coding and/or decoding of audio, image, and/or video data or assisting in coding and/or decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals, for example, for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and/or for receiving radio frequency signals from other apparatus(es).

The apparatus 50 may comprise a camera 42 capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
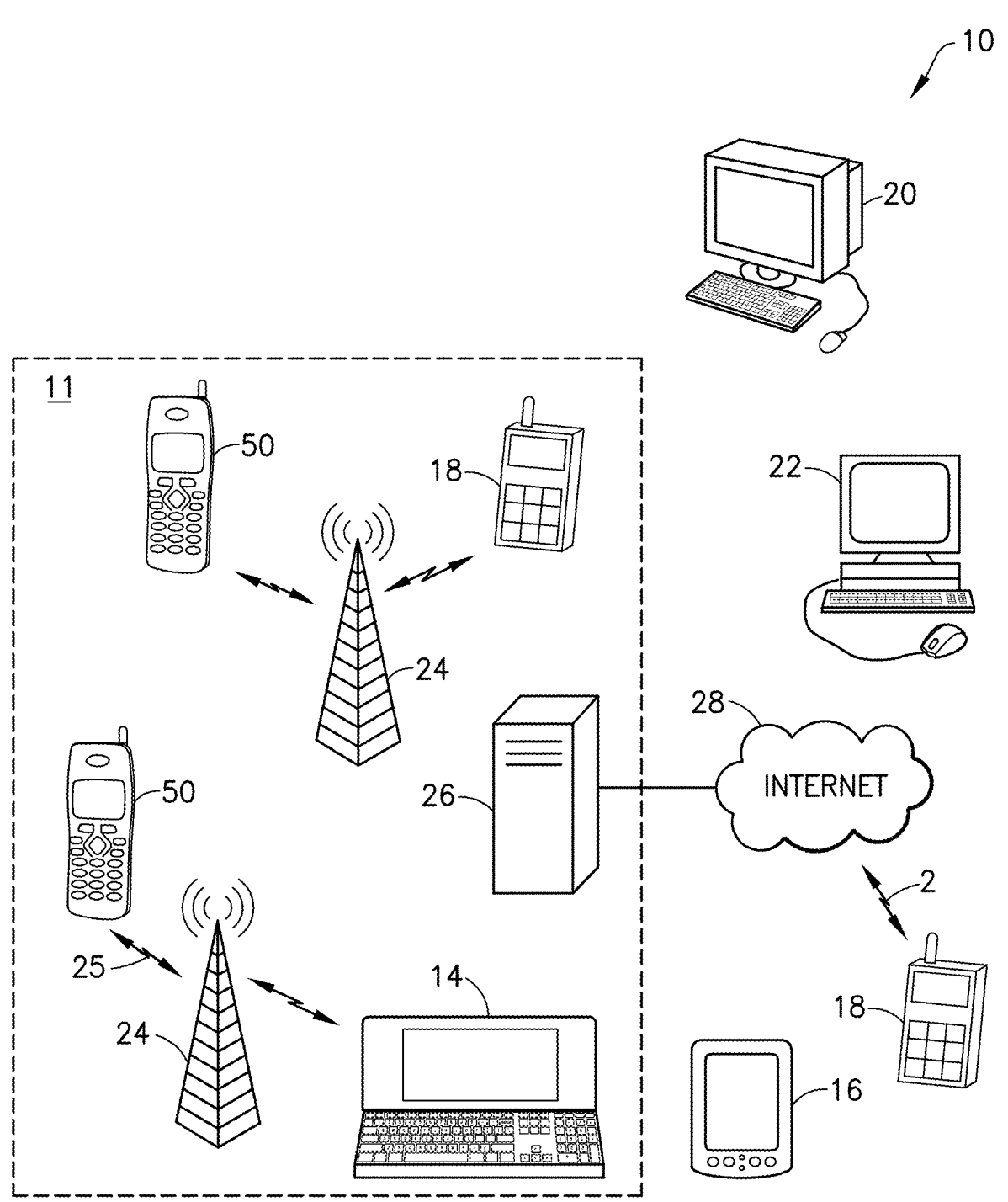
FIG. 3 further shows schematically electronic devices employing embodiments of the examples described herein connected using wireless and wired network connections.

With respect to FIG. 3, an example of a system within which embodiments of the examples described herein can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA, LTE, 4G, 5G network, and the like), a wireless local area network (WLAN) such as defined by any of the IEEE 802.x standards, a Bluetooth® personal area network, an Ethernet local area network, a token ring local area network, a wide area network, and the Internet.

The system 10 may include both wired and wireless communication devices and/or apparatus 50 suitable for implementing embodiments of the examples described herein.

For example, the system shown in FIG. 3 shows a mobile telephone network 11 and a representation of the Internet 28. Connectivity to the Internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; for example, a digital TV receiver, which may/may not have a display or wireless capabilities, in tablets or (laptop) personal computers (PC), which have hardware and/or software to process neural network data, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the Internet 28. The system may include additional communication devices and communication devices of various types.

The communication devices may communicate using various transmission technologies including, but not limited to, code division multiple access (CDMA), global systems for mobile communications (GSM), universal mobile tele-communications system (UMTS), time divisional multiple access (TDMA), frequency division multiple access (FDMA), transmission control protocol-internet protocol (TCP-IP), short messaging service (SMS), multimedia mes-saging service (MMS), email, instant messaging service (IMS), Bluetooth®, IEEE 802.11, 3GPP Narrowband IoT and any similar wireless communication technology. A communications device involved in implementing various embodiments of the examples described herein may com-municate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

The embodiments may also be implemented in so-called Internet of Things (IoT) devices. The IoT may be defined, for example, as an interconnection of uniquely identifiable embedded computing devices within the existing Internet infrastructure. The convergence of various technologies has and may enable many fields of embedded systems, such as wireless sensor networks, control systems, home/building automation, and the like, to be included in the IoT. In order to utilize the Internet, IoT devices are provided with an IP address as a unique identifier. IoT devices may be provided with a radio transmitter, such as a WLAN or a Bluetooth® transmitter or an RFID tag. Alternatively, IoT devices may have access to an IP-based network via a wired network, such as an Ethernet-based network or a power-line connec-tion (PLC).

The devices/systems described in FIGS. 1 to 3 provide mechanisms to implement inter-codec model or architecture to encode or decode a media frame and/or transportation of, for example, neural network representation and media stream.

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbre-viated ISOBMFF) and file format for NAL unit structured video (ISO/IEC 14496-15), which derives from the ISOBMFF.

Video codec consists of an encoder that transforms the input video into a compressed representation suited for storage/transmission and a decoder that can decompress the compressed video representation back into a viewable form, or into a form that is suitable as an input to one or more algorithms for analysis or processing. A video encoder and/or a video decoder may also be separate from each other, for example, need not form a codec. Typically, encoder discards some information in the original video sequence in order to represent the video in a more compact form (e.g., at lower bitrate).

Typical hybrid video encoders, for example, many encoder implementations of ITU-T H.263 and H.264, encode the video information in two phases. Firstly pixel values in a certain picture area (or 'block') are predicted, for example, by motion compensation means (finding and indi-cating an area in one of the previously coded video frames that corresponds closely to the block being coded) or by spatial means (using the pixel values around the block to be coded in a specified manner). Secondly the prediction error, for example, the difference between the predicted block of pixels and the original block of pixels, is coded. This is typically done by transforming the difference in pixel values using a specified transform (for example, Discrete Cosine Transform (DCT) or a variant of it), quantizing the coeffi-cients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction and current picture referencing), prediction is applied similarly to temporal prediction, but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Inter prediction, which may also be referred to as tem-poral prediction, motion compensation, or motion-compen-sated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, for example, either sample values or transform coefficients can be predicted. Intra prediction is typically exploited in intra-coding, where no inter prediction is applied.

One outcome of the coding procedure is a set of coding parameters, such as motion vectors and quantized transform coefficients. Many parameters can be entropy-coded more efficiently when they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
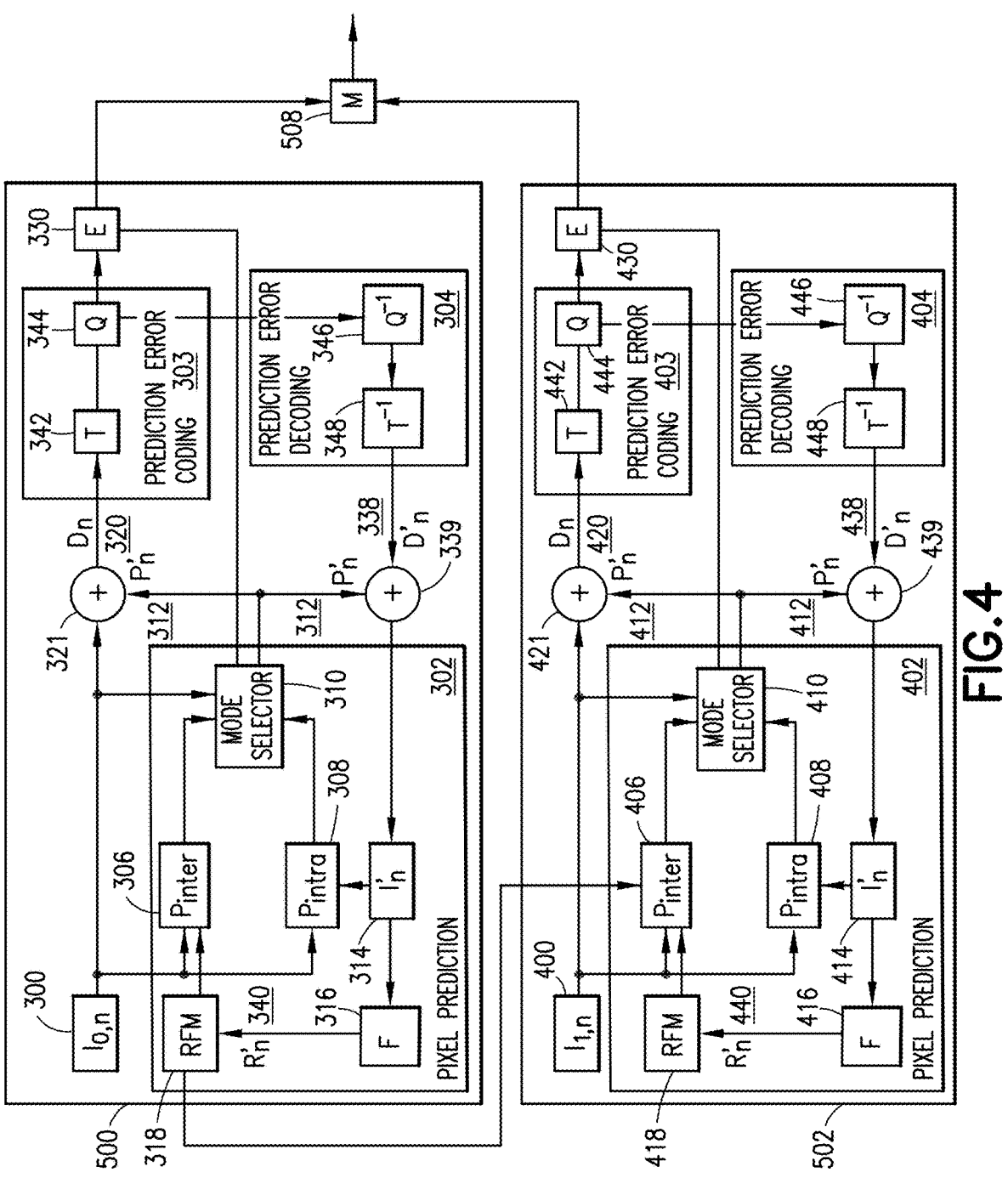
FIG. 4 shows schematically a block diagram of an encoder on a general level.

FIG. 4 shows a block diagram of a general structure of a video encoder. FIG. 4 presents an encoder for two layers, but it would be appreciated that presented encoder could be similarly extended to encode more than two layers. FIG. 4 illustrates a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives base layer image(s) 300 of a video stream to be encoded at both the inter-predictor 306 (which determines the difference between the image and a motion compensated reference frame) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer image 300. Correspondingly, the pixel predictor 402 of the second encoder section 502 receives enhancement layer image(s) 400 of a video stream to be encoded at both the inter-predictor 406 (which determines the difference between the image and a motion compensated reference frame) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector 310, 410 is passed to a first summing device 321, 421. The first summing device may subtract the output of the pixel predictor 302, 402 from the base layer image 300/enhancement layer image 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer image 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor

406 to be used as the reference image against which a future enhancement layer image 400 is compared in inter-prediction operations. Moreover, the reference frame memory 418 may be connected to the inter-predictor 406 to be used as the reference image against which a future enhancement layer image 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, for example, the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 346, 446, which dequantizes the quantized coefficient values, for example, DCT coefficients, to reconstruct the transform signal and an inverse transformation unit 348, 448, which performs the inverse transformation to the reconstructed transform signal wherein the output of the inverse transformation unit 348, 448 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide a compressed signal. The outputs of the entropy encoders 330, 430 may be inserted into a bitstream, for example, by a multiplexer 508.

Figures 5, 6:
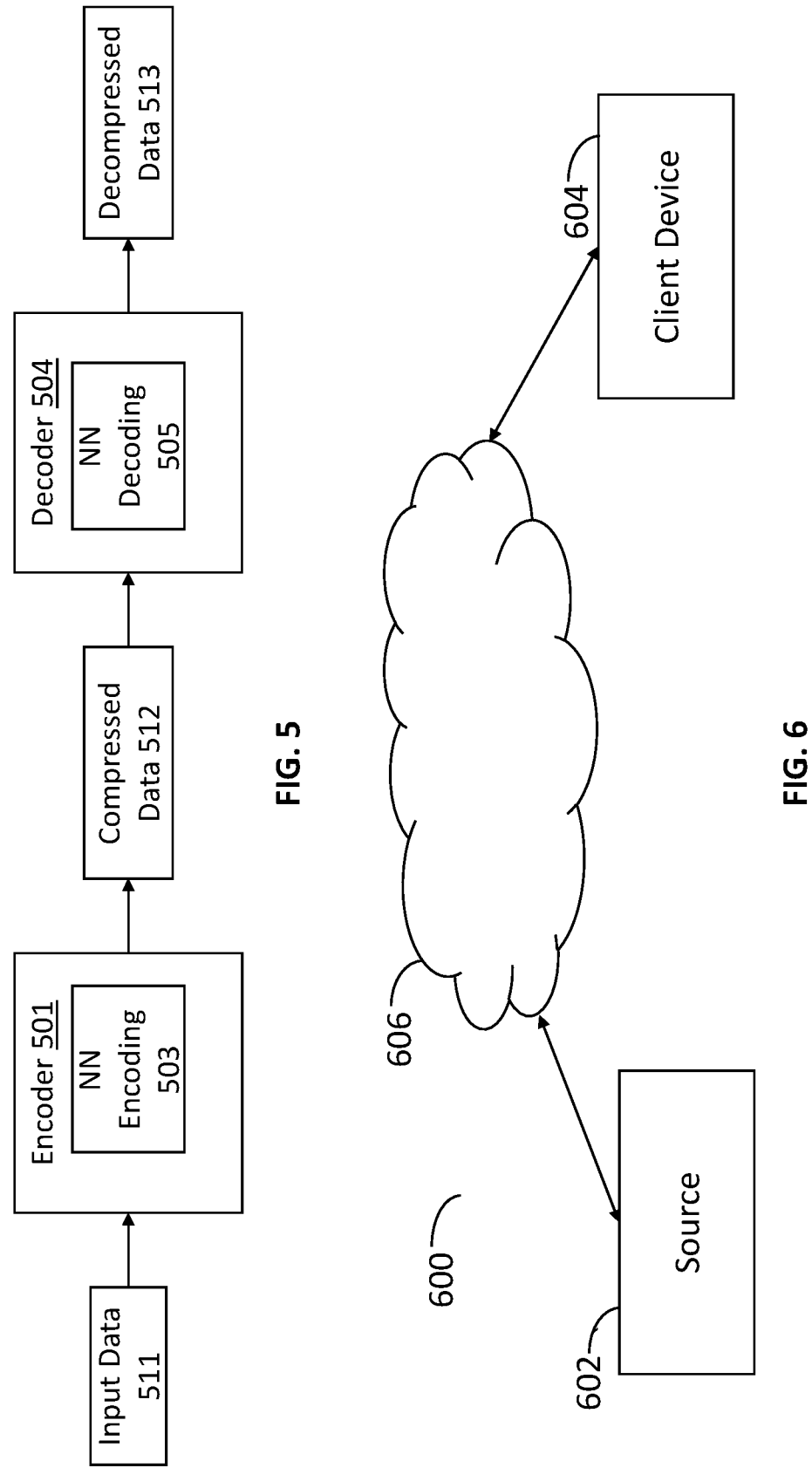
FIG. 5 is a block diagram showing an interface between an encoder and a decoder in accordance with the examples described herein.
FIG. 6 illustrates a system configured to support streaming of media data from a source to a client device.

FIG. 5 is a block diagram showing the interface between an encoder 501 implementing neural network encoding 503, and a decoder 504 implementing neural network decoding 505, in accordance with the examples described herein. The encoder 501 may embody a device, a software method or a hardware circuit. The encoder 501 has the goal of compressing input data 511 (for example, an input video) to compressed data 512 (for example, a bitstream) such that the bitrate is minimized, and the accuracy of an analysis or processing algorithm is maximized. To this end, the encoder 501 uses an encoder or compression algorithm, for example, to perform neural network encoding 503, e.g., encoding the input data by using one or more neural networks.

The general analysis or processing algorithm may be part of the decoder 504. The decoder 504 uses a decoder or decompression algorithm, for example to perform the neural network decoding 505 (e.g., decoding by using one or more neural networks) to decode the compressed data 512 (for example, compressed video) which was encoded by the encoder 501. The decoder 504 produces decompressed data 513 (for example, reconstructed data).

The encoder 501 and decoder 504 may be entities implementing an abstraction, may be separate entities or the same entities, or may be part of the same physical device.

The method and apparatus of an example embodiment may be utilized in a wide variety of systems, including systems that rely upon the compression and decompression of media data and possibly also the associated metadata. In one embodiment, however, the method and apparatus are configured to compress the media data and associated metadata streamed from a source via a content delivery network to a client device, at which point the compressed media data and associated metadata is decompressed or otherwise processed. In this regard, FIG. 6 depicts an example of such a system 600 that includes a source 602 of media data and associated metadata. The source may be, in one embodiment, a server. However, the source may be embodied in other manners if so desired. The source is configured to stream boxes containing the media data and associated metadata to a client device 604. The client device may be embodied by a media player, a multimedia system, a video system, a smart phone, a mobile telephone or other user equipment, a personal computer, a tablet computer or any other computing device configured to receive and decompress the media data and process associated metadata. In the illustrated embodiment, boxes of media data and boxes of metadata are streamed via a network 606, such as any of a wide variety of types of wireless networks and/or wireline networks. The client device is configured to receive structured information containing media, metadata and any other relevant representation of information containing the media and the metadata and to decompress the media data and process the associated metadata (e.g. for proper playback timing of decompressed media data).

Figure 7:
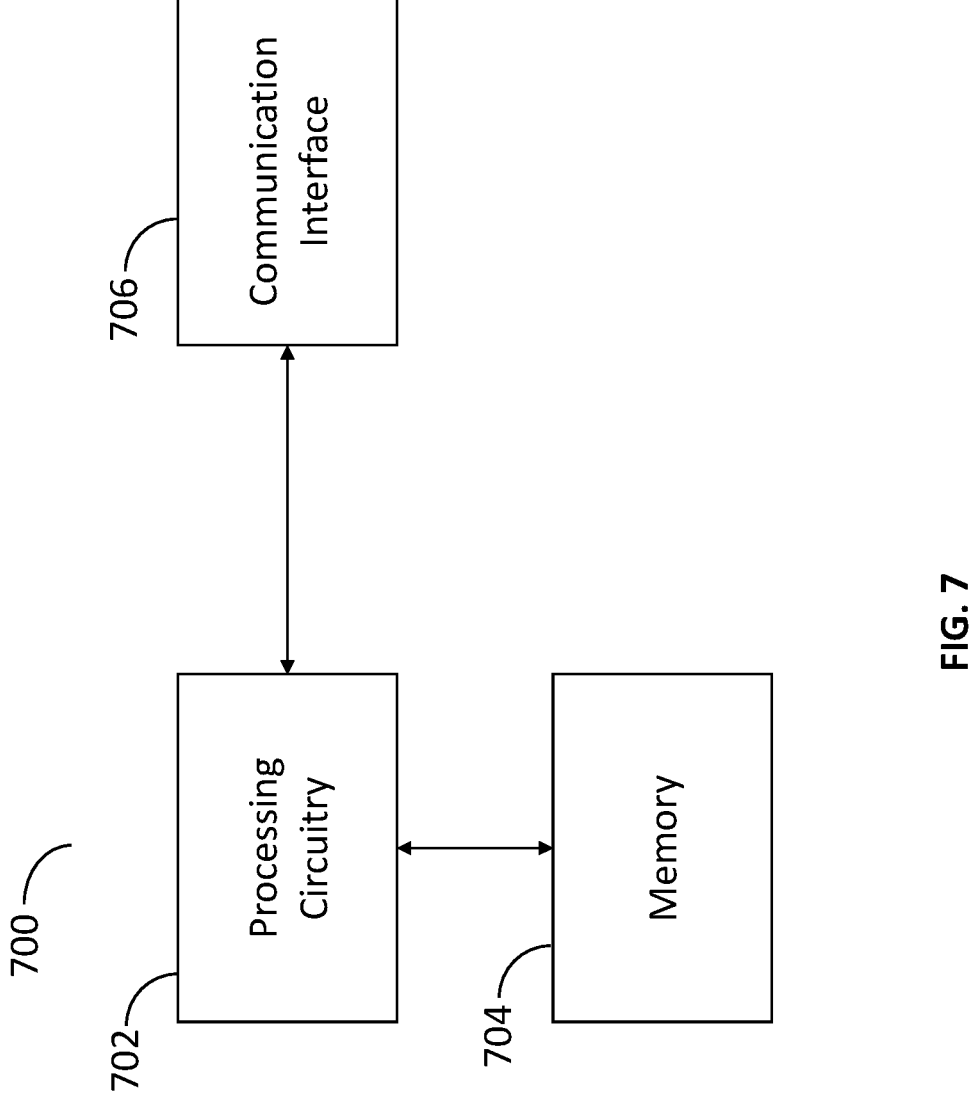
FIG. 7 is a block diagram of an apparatus that may be specifically configured in accordance with an example embodiment.

An apparatus 700 is provided in accordance with an example embodiment as shown in FIG. 7. In one embodiment, the apparatus of FIG. 7 may be embodied by a source 602, such as a file writer which, in turn, may be embodied by a server, that is configured to stream a compressed representation of the media data and associated metadata. In an alternative embodiment, the apparatus may be embodied by the client device 604, such as a file reader which may be embodied, for example, by any of the various computing devices described above. In either of these embodiments and as shown in FIG. 7, the apparatus of an example embodiment includes, is associated with or is in communication with a processing circuitry 702, one or more memory devices 704, a communication interface 706, and optionally a user interface.

The processing circuitry 702 may be in communication with the memory device 704 via a bus for passing information among components of the apparatus 700. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 700 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single 'system on a chip.' As such, in some cases, a chip or chipset may constitute means for performing one or more operations for providing the functionalities described herein.

The processing circuitry 702 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 702 may be configured to execute instructions stored in the memory device 704 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processing circuitry to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 706 may be any means such as a device or circuitry embodied in either hardware or a combination of hardware and software that is configured to receive and/or transmit data, including video bitstreams. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, the apparatus 700 may optionally include a user interface that may, in turn, be in communication with the processing circuitry 702 to provide output to a user, such as by outputting an encoded video bitstream and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processing circuitry may comprise user interface circuitry configured to control at least some functions of one or more user interface elements such as a display and, in some embodiments, a speaker, ringer, microphone and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., memory device, and/or the like).

Fundamentals of Neural Networks

A neural network (NN) is a computation graph consisting of several layers of computation. Each layer consists of one or more units, where each unit performs a computation. A unit is connected to one or more other units, and a connection may be associated with a weight. The weight may be used for scaling the signal passing through an associated connection. Weights are learnable parameters, for example, values which can be learned from training data. There may be other learnable parameters, such as those of batch-normalization layers.

Couple of examples of architectures for neural networks are feed-forward and recurrent architectures. Feed-forward neural networks are such that there is no feedback loop, each layer takes input from one or more of the previous layers, and provides its output as the input for one or more of the subsequent layers. Also, units inside a certain layer take input from units in one or more of preceding layers and provide output to one or more of following layers.

Initial layers, those close to the input data, extract semantically low-level features, for example, edges and textures in images, and intermediate and final layers extract more high-level features. After the feature extraction layers, there may be one or more layers performing a certain task, for example, classification, semantic segmentation, object detection, denoising, style transfer, super-resolution, and the like. In recurrent neural networks, there is a feedback loop, so that the neural network becomes stateful, for example, it is able to memorize information or a state.

Neural networks are being utilized in an ever-increasing number of applications for many different types of devices, for example, mobile phones, chat bots, IoT devices, smart cars, voice assistants, and the like. Some of these applications include, but are not limited to, image and video analysis and processing, social media data analysis, device usage data analysis, and the like.

One of the properties of neural networks, and other machine learning tools, is that they can learn properties from input data, either in a supervised way or in an unsupervised way. Such learning is a result of a training algorithm, or of a meta-level neural network providing the training signal.

In general, the training algorithm consists of changing some properties of the neural network so that its output is as close as possible to a desired output. For example, in the case of classification of objects in images, the output of the neural network can be used to derive a class or category index which indicates the class or category that the object in the input image belongs to. Training usually happens by minimizing or decreasing the output error, also referred to as the loss. Examples of losses are mean squared error, cross-entropy, and the like. In recent deep learning techniques, training is an iterative process, where at each iteration the algorithm modifies the weights of the neural network to make a gradual improvement in the network's output, for example, gradually decrease the loss.

Training a neural network is an optimization process, but the final goal is different from the typical goal of optimization. In optimization, the only goal is to minimize a function. In machine learning, the goal of the optimization or training process is to make the model learn the properties of the data distribution from a limited training dataset. In other words, the goal is to learn to use a limited training dataset in order to learn to generalize to previously unseen data, for example, data which was not used for training the model. This is usually referred to as generalization. In practice, data is usually split into at least two sets, the training set and the validation set. The training set is used for training the network, for example, to modify its learnable parameters in order to minimize the loss. The validation set is used for checking the performance of the network on data, which was not used to minimize the loss, as an indication of the final performance of the model. In particular, the errors on the training set and on the validation set are monitored during the training process to understand the following:

If the network is learning at all—in this case, the training set error should decrease, otherwise the model is in the regime of underfitting.

If the network is learning to generalize—in this case, also the validation set error needs to decrease and be not too much higher than the training set error. For example, the validation set error should be less than 20% higher than the training set error. If the training set error is low, for example 10% of its value at the beginning of training, or with respect to a threshold that may have been determined based on an evaluation metric, but the validation set error is much higher than the training set error, or it does not decrease, or it even increases, the model is in the regime of overfitting. This means that the model has just memorized properties of the training set and performs well only on that set, but performs poorly on a set not used for training or tuning its parameters.

Lately, neural networks have been used for compressing and de-compressing data such as images. The most widely used architecture for such task is the auto-encoder, which is a neural network consisting of two parts: a neural encoder and a neural decoder. In various embodiments, these neural encoder and neural decoder would be referred to as encoder and decoder, even though these refer to algorithms which are learned from data instead of being tuned manually. The encoder takes an image as an input and produces a code, to represent the input image, which requires less bits than the input image. This code may have been obtained by a binarization or quantization process after the encoder. The decoder takes in this code and reconstructs the image which was input to the encoder.

Such encoder and decoder are usually trained to minimize a combination of bitrate and distortion, where the distortion may be based on one or more of the following metrics: mean squared error (MSE), peak signal-to-noise ratio (PSNR), structural similarity index measure (SSIM), or the like. These distortion metrics are meant to be correlated to the human visual perception quality, so that minimizing or maximizing one or more of these distortion metrics results into improving the visual quality of the decoded image as perceived by humans.

In various embodiments, terms 'model', 'neural network', 'neural net' and 'network' may be used interchangeably, and also the weights of neural networks may be sometimes referred to as learnable parameters or as parameters.

Fundamentals of Video/Image Coding

Video codec consists of an encoder that transforms the input video into a compressed representation suited for storage/transmission and a decoder that can decompress the compressed video representation back into a viewable form. Typically, an encoder discards some information in the original video sequence in order to represent the video in a more compact form, for example, at lower bitrate.

Typical hybrid video codecs, for example ITU-T H.263 and H.264, encode the video information in two phases. Firstly, pixel values in a certain picture area (or 'block') are predicted. In an example, the pixel values may be predicted by using motion compensation algorithm. This prediction technique includes finding and indicating an area in one of the previously coded video frames that corresponds closely to the block being coded.

In other example, the pixel values may be predicted by using spatial prediction techniques. This prediction technique uses the pixel values around the block to be coded in a specified manner Secondly, the prediction error, for example, the difference between the predicted block of pixels and the original block of pixels is coded. This is typically done by transforming the difference in pixel values using a specified transform, for example, discrete cosine transform (DCT) or a variant of it; quantizing the coefficients; and entropy coding the quantized coefficients. By varying the fidelity of the quantization process, encoder can control the balance between the accuracy of the pixel representation, for example, picture quality and size of the resulting coded video representation, for example, file size or transmission bitrate.

Inter prediction, which may also be referred to as temporal prediction, motion compensation, or motion-compensated prediction, exploits temporal redundancy. In inter prediction the sources of prediction are previously decoded pictures.

Intra prediction utilizes the fact that adjacent pixels within the same picture are likely to be correlated. Intra prediction can be performed in spatial or transform domain, for example, either sample values or transform coefficients can be predicted. Intra prediction is typically exploited in intra-coding, where no inter prediction is applied.

One outcome of the coding procedure is a set of coding parameters, such as motion vectors and quantized transform coefficients. Many parameters can be entropy-coded more efficiently when they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

The decoder reconstructs the output video by applying prediction techniques similar to the encoder to form a predicted representation of the pixel blocks. For example, using the motion or spatial information created by the encoder and stored in the compressed representation and prediction error decoding, which is inverse operation of the prediction error coding recovering the quantized prediction error signal in spatial pixel domain After applying prediction and prediction error decoding techniques the decoder sums up the prediction and prediction error signals, for example, pixel values to form the output video frame. The decoder and encoder can also apply additional filtering techniques to improve the quality of the output video before passing it for display and/or storing it as prediction reference for the forthcoming frames in the video sequence.

In typical video codecs the motion information is indicated with motion vectors associated with each motion compensated image block. Each of these motion vectors represents the displacement of the image block in the picture to be coded in the encoder side or decoded in the decoder side and the prediction source block in one of the previously coded or decoded pictures.

In order to represent motion vectors efficiently, the motion vectors are typically coded differentially with respect to block specific predicted motion vectors. In typical video codecs, the predicted motion vectors are created in a predefined way, for example, calculating the median of the encoded or decoded motion vectors of the adjacent blocks.

Another way to create motion vector predictions is to generate a list of candidate predictions from adjacent blocks and/or co-located blocks in temporal reference pictures and signaling the chosen candidate as the motion vector predictor. In addition to predicting the motion vector values, the reference index of previously coded/decoded picture can be predicted. The reference index is typically predicted from adjacent blocks and/or or co-located blocks in temporal reference picture.

Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signaled among a list of motion field candidate list filled with motion field information of available adjacent/co-located blocks.

In typical video codecs, the prediction residual after motion compensation is first transformed with a transform kernel, for example, DCT and then coded. The reason for this is that often there still exists some correlation among the residual and transform can in many cases help reduce this correlation and provide more efficient coding.

Typical video encoders utilize Lagrangian cost functions to find optimal coding modes, for example, the desired macroblock mode and associated motion vectors. This kind of cost function uses a weighting factor to tie together the exact or estimated image distortion due to lossy coding methods and the exact or estimated amount of information that is required to represent the pixel values in an image area:

$$C = D + \lambda R \qquad \text{equation 1}$$

In equation 1, C is the Lagrangian cost to be minimized, D is the image distortion, for example, mean squared error with the mode and motion vectors considered, and R is the number of bits needed to represent the required data to reconstruct the image block in the decoder including the amount of data to represent the candidate motion vectors.

Video coding specifications may enable the use of supplemental enhancement information (SEI) messages or alike. Some video coding specifications include SEI NAL units, and some video coding specifications contain both prefix SEI NAL units and suffix SEI NAL units, where the former type can start a picture unit or alike and the latter type can end a picture unit or alike. An SEI NAL unit contains one or more SEI messages, which are not required for the decoding of output pictures but may assist in related processes, such as picture output timing, post-processing of decoded pictures, rendering, error detection, error concealment, and resource reservation.

Several SEI messages are specified in H.264/AVC, H.265/HEVC, H.266/VVC, and H.274/VSEI standards, and the user data SEI messages enable organizations and companies to specify SEI messages for their own use. The standards may contain the syntax and semantics for the specified SEI messages but a process for handling the messages in the recipient might not be defined. Consequently, encoders may be required to follow the standard specifying a SEI message when they create SEI message(s), and decoders might not be required to process SEI messages for output order conformance One of the reasons to include the syntax and semantics of SEI messages in standards is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

A design principle has been followed for SEI message specifications: the SEI messages are generally not extended in future amendments or versions of the standard.

Filters in Video Codecs

Conventional image and video codecs use a set of filters to enhance the visual quality of the predicted visual content and can be applied either in-loop or out-of-loop, or both. In the case of in-loop filters, the filter applied on one block in the currently-encoded frame may affect the encoding of another block in the same frame and/or in another frame which is predicted from the current frame. An in-loop filter can affect the bitrate and/or the visual quality. An enhanced block may cause a smaller residual, difference between original block and predicted-and-filtered block, thus using less bits in the bitstream output by the encoder. An out-of-loop filter may be applied on a frame after it has been reconstructed, the filtered visual content may not be a source for prediction, and thus it may only impact the visual quality of the frames that are output by the decoder.

Information on Neural Network Based Image/Video Coding

Recently, neural networks (NNs) have been used in the context of image and video compression, by following mainly two approaches.

In one approach, NNs are used to replace or are used as an addition to one or more of the components of a traditional codec such as VVC/H.266. Here, 'traditional' means, those codecs whose components and parameters are typically not learned from data by means of a training process, for example, those codecs whose components are not neural networks. Some examples of uses of neural networks within a traditional codec include but are not limited to:

Additional in-loop filter, for example, by having the NN as an additional in-loop filter with respect to the traditional loop filters;

Single in-loop filter, for example, by having the NN replacing all traditional in-loop filters;

Intra-frame prediction, for example, as an additional intra-frame prediction mode, or replacing the traditional intra-frame prediction;

Inter-frame prediction, for example, as an additional inter-frame prediction mode, or replacing the traditional inter-frame prediction;

Transform and/or inverse transform, for example, as an additional transform and/or inverse transform, or replacing the traditional transform and/or inverse transform; and Probability model for the arithmetic codec, for example, as an additional probability model, or replacing the traditional probability model.

Figure 8:
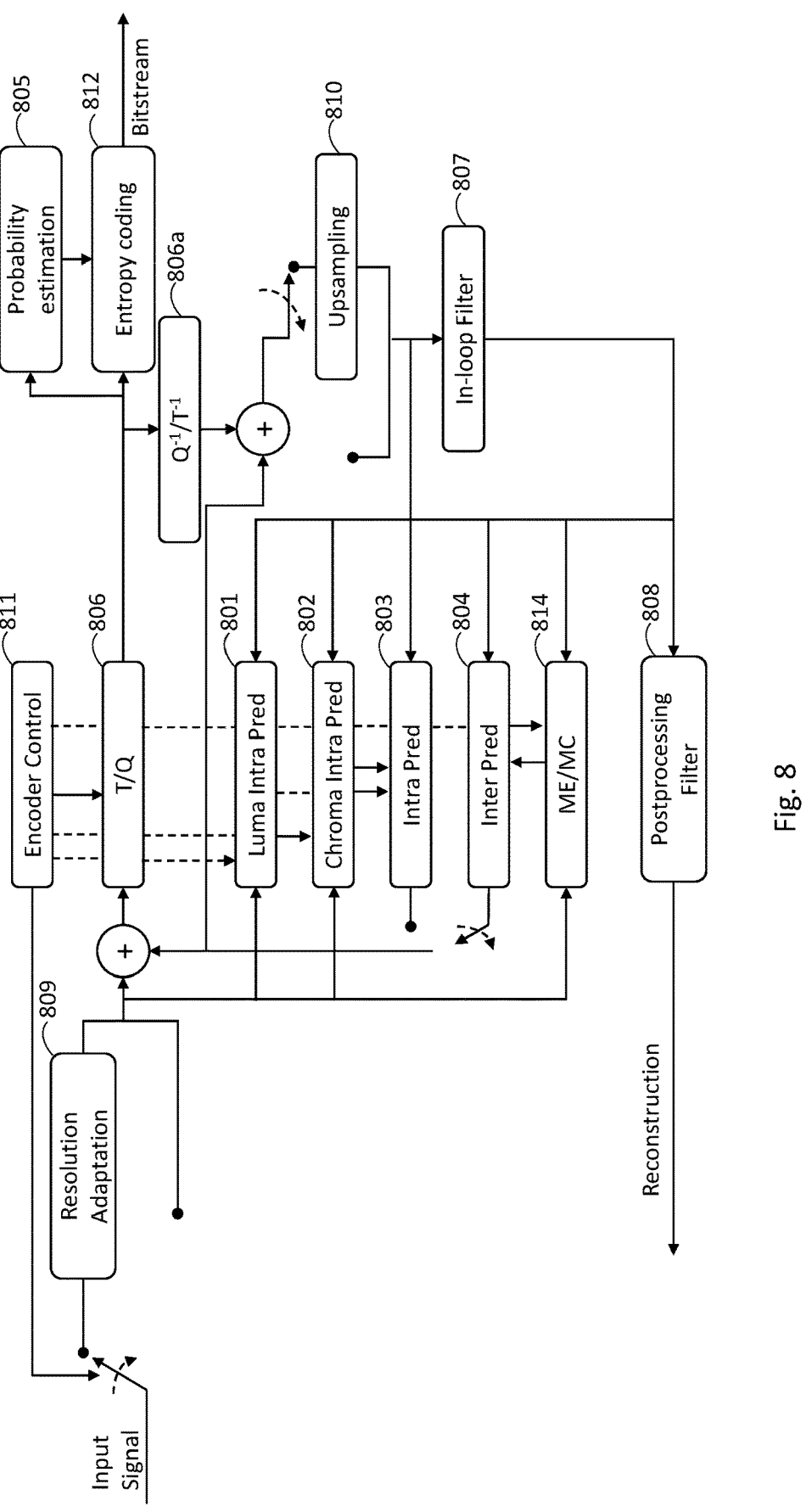
FIG. 8 illustrates examples of functioning of neural networks (NNs) as components of a traditional codec's pipeline, in accordance with an example embodiment.

FIG. 8 illustrates examples of functioning of NNs as components of a pipeline of a traditional codec, in accordance with an embodiment. In particular, FIG. 8 illustrates an encoder, which also includes a decoding loop. FIG. 8 is shown to include components described below:

Luma Intra Pred block or circuit 801. This block or circuit performs intra prediction in the luma domain, for example, by using already reconstructed data from the same frame. The operation of Luma Intra Pred block or circuit 801 may be performed by a deep neural network such as a convolutional auto-encoder.

Chroma Intra Pred block or circuit 802. This block or circuit performs intra prediction in the chroma domain, for example, by using already reconstructed data from the same frame. Chroma Intra Pred block or circuit 802 may perform cross-component prediction, for example, predicting chroma from luma. The operation of Chroma Intra Pred 802 may be performed by a deep neural network such as a convolutional auto-encoder.

Intra Pred block or circuit 803 and Inter-Pred block or circuit 804. These blocks or circuit perform intra prediction and inter-prediction, respectively. Intra Pred block or circuit 803 and Inter-Pred block or circuit 804 may perform the prediction on all components, for example, luma and chroma. The operations of Intra Pred block or circuit 803 and Inter-Pred block or circuit 804 may be performed by two or more deep neural networks such as convolutional auto-encoders.

Probability estimation block or circuit 805 for entropy coding. This block or circuit performs prediction of probability for the next symbol to encode or decode, which is then provided to the entropy coding module 812, such as the arithmetic coding module, to encode or decode the next symbol. The operation of the probability estimation block or circuit 805 may be performed by a neural network.

Transform and quantization (T/Q) block or circuit 806. These are actually two blocks or circuits. The transform and quantization block or circuit 806 may perform a transform of input data to a different domain, for example, the FFT transform would transform the data to frequency domain. The transform and quantization block or circuit 806 may quantize its input values to a smaller set of possible values. In the decoding loop, there may be inverse quantization block or circuit and inverse transform block or circuit $Q^{-1}/T^{-1}$ 806a. One or both of the transform block or circuit and quantization block or circuit may be replaced by one or two or more neural networks. One or both of the inverse transform block or circuit and inverse quantization block or circuit may be replaced by one or two or more neural networks.

In-loop filter block or circuit 807. Operations of the in-loop filter block or circuit 807 is performed in the decoding loop, and it performs filtering on the output of the inverse transform block or circuit, or anyway on the reconstructed data, in order to enhance the reconstructed data with respect to one or more predetermined quality metrics. This filter may affect both the quality of the decoded data and the bitrate of the bitstream output by the encoder. The operation of the in-loop filter block or circuit 807 may be performed by a neural network, such as a convolutional auto-encoder. In examples, the operation of the in-loop filter may be performed by multiple steps or filters, where the one or more steps may be performed by neural networks.

Post-processing filter block or circuit 808. The post-processing filter block or circuit 808 may be performed only at decoder side, as it may not affect the encoding process. The post-processing filter block or circuit 808 filters the reconstructed data output by the in-loop filter block or circuit 807, in order to enhance the reconstructed data. The post-processing filter 808 may be replaced by a neural network, such as a convolutional auto-encoder.

Resolution Adaptation block or circuit 809: this block or circuit may downsample the input video frames, prior to encoding. Then, in the decoding loop, the reconstructed data may be upsampled, by the upsampling block or circuit 810, to the original resolution. The operation of the resolution Adaptation block or circuit 809 block or circuit may be performed by a neural network such as a convolutional auto-encoder.

Encoder Control block or circuit 811. This block or circuit performs optimization of encoder's parameters, such as what transform to use, what quantization parameters (QP) to use, what intra-prediction mode (out of N intra-prediction modes) to use, and the like. The operation of Encoder Control block or circuit 811 may be performed by a neural network, such as a classifier convolutional network, or such as a regression convolutional network.

Figure 9:
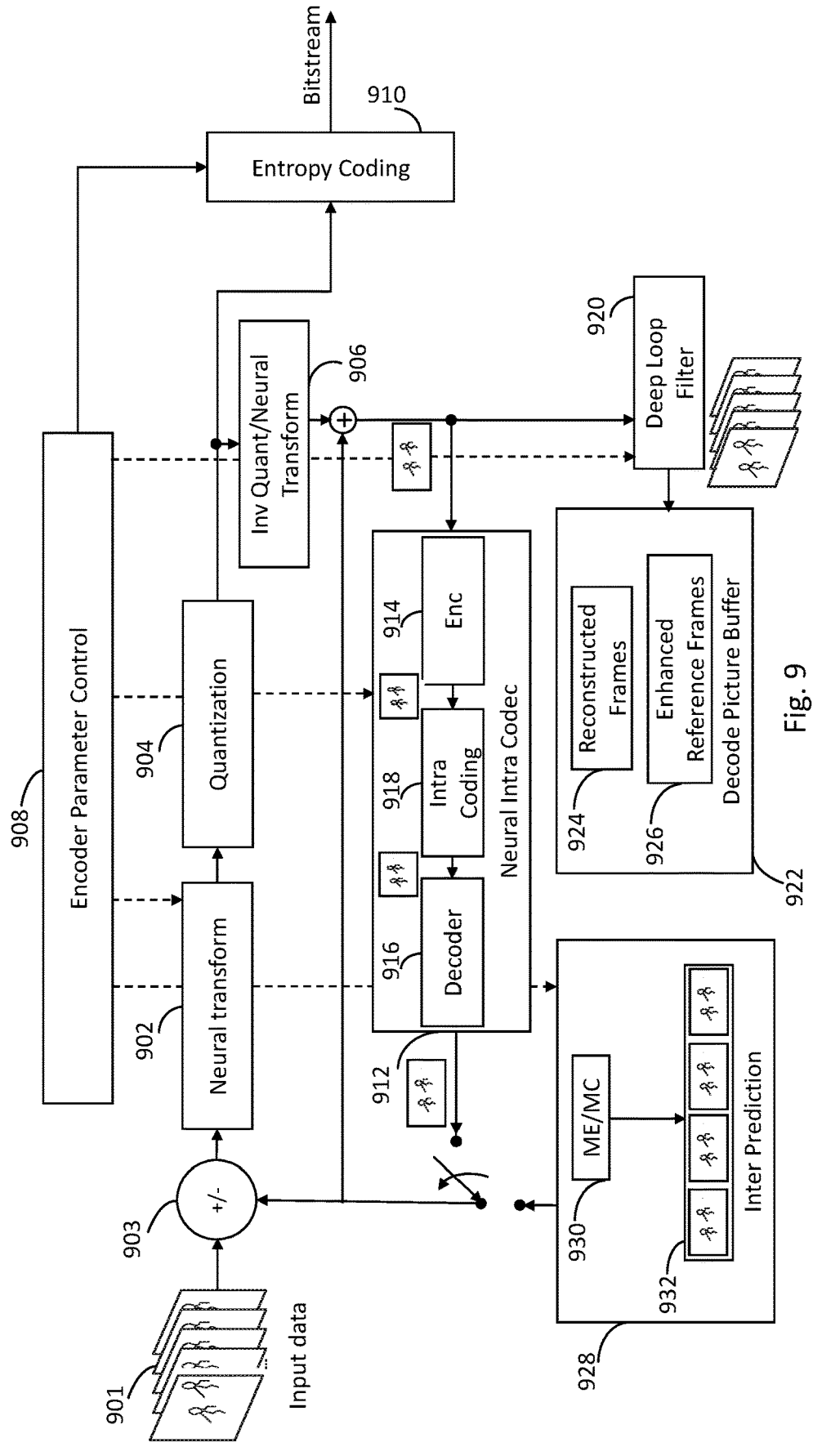
FIG. 9 illustrates an example of modified video coding pipeline based on neural network, in accordance with an example embodiment.

ME/MC block or circuit 814 performs motion estimation and/or motion compensation, which are two key operations to be performed when performing inter-frame prediction. ME/MC stands for motion estimation/motion compensation In another approach, commonly referred to as 'end-to-end learned compression', NNs are used as the main components of the image/video codecs. In this second approach, there are following two example options:

Option 1: re-use the video coding pipeline but replace most or all the components with NNs. Referring to FIG. 9, it illustrates an example of modified video coding pipeline based on neural network, in accordance with an embodiment. An example of neural network may include, but is not limited, a compressed representation of a neural network. FIG. 9 is shown to include following components:

Neural transform block or circuit 902: this block or circuit transforms the output of a summation/subtraction operation 903 to a new representation of that data, which may have lower entropy and thus be more compressible.

Quantization block or circuit 904: this block or circuit quantizes an input data 901 to a smaller set of possible values.

Inverse transform and inverse quantization blocks or circuits 906. These blocks or circuits perform the inverse or approximately inverse operation of the transform and the quantization, respectively.

Encoder parameter control block or circuit 908. This block or circuit may control and optimize some or all the parameters of the encoding process, such as parameters of one or more of the encoding blocks or circuits.

Entropy coding block or circuit 910. This block or circuit may perform lossless coding, for example, based on entropy. One popular entropy coding technique is arithmetic coding.

Neural intra-codec block or circuit 912. This block or circuit may be an image compression and decompression block or circuit, which may be used to encode and decode an intra frame. Enc 914 may be an encoder block or circuit, such as the neural encoder part of an auto-encoder neural network. A decoder 916 may be a decoder block or circuit, such as the neural decoder part of an auto-encoder neural network. An intra-coding block or circuit 918 may be a block or circuit performing some intermediate steps between encoder and decoder, such as quantization, entropy encoding, entropy decoding, and/or inverse quantization.

Deep Loop Filter block or circuit 920. This block or circuit performs filtering of reconstructed data, in order to enhance it.

Decode picture buffer block or circuit 922. This block or circuit is a memory buffer, keeping the decoded frame, for example, reconstructed frames 924 and enhanced reference frames 926 to be used for inter prediction.

Inter-prediction block or circuit 928. This block or circuit performs inter-frame prediction, for example, predicts from frames, for example, frames 932, which are temporally nearby. ME/MC 930 performs motion estimation and/or motion compensation, which are two key operations to be performed when performing inter-frame prediction. ME/MC stands for motion estimation/motion compensation.

In order to train the neural networks of this system, a training objective function, referred to as 'training loss', is typically utilized, which usually comprises one or more terms, or loss terms, or simply losses. Although here the Option 2 and FIG. 10 considered as example for describing the training objective function, a similar training objective function may also be used for training the neural networks for the systems in FIG. 6 and FIG. 7. In one example, the training loss comprises a reconstruction loss term and a rate loss term. The reconstruction loss encourages the system to decode data that is similar to the input data, according to some similarity metric. Following are some example of reconstruction losses:

a loss derived from mean squared error (MSE);

a loss derived from multi-scale structural similarity (MS-SSIM), such as 1 minus MS-SSIM, or 1−MS-SSIM;

Losses derived from the use of a pretrained neural network. For example, error(f1, f2), where f1 and f2 are the features extracted by a pretrained neural network for the input (uncompressed) data and the decoded (reconstructed) data, respectively, and error( ) is an error or distance function, such as L1 norm or L2 norm; and Losses derived from the use of a neural network that is trained simultaneously with the end-to-end learned codec. For example, adversarial loss may be used, which is the loss provided by a discriminator neural network that is trained adversarially with respect to the codec, following the settings proposed in the context of generative adversarial networks (GANs) and their variants.

The rate loss encourages the system to compress the output of the encoding stage, such as the output of the arithmetic encoder. 'Compressing', for example, means reducing the number of bits output by the encoding stage.

When an entropy-based lossless encoder is used, such as the arithmetic encoder, the rate loss typically encourages the output of the Encoder NN to have low entropy. The rate loss may be computed on the output of the Encoder NN, or on the output of the quantization operation, or on the output of the probability model. Following are some examples of rate losses:

A differentiable estimate of the entropy;

A sparsification loss, for example, a loss that encourages the output of the Encoder NN or the output of the quantization to have many zeros. Examples are L0 norm, L1 norm, L1 norm divided by L2 norm; and A cross-entropy loss applied to the output of a probability model, where the probability model may be a NN used to estimate the probability of the next symbol to be encoded by the arithmetic encoder.

For training one or more neural networks that are part of a codec, such as one or more neural networks in FIG. 8 and/or FIG. 9, one or more of reconstruction losses may be used, and one or more of rate losses may be used. All the loss terms may then be combined for example as a weighted sum to obtain the training objective function. Typically, the different loss terms are weighted using different weights, and these weights determine how the final system performs in terms of rate-distortion loss. For example, when more weight is given to one or more of the reconstruction losses with respect to the rate losses, the system may learn to compress less but to reconstruct with higher accuracy as measured by a metric that correlates with the reconstruction losses. These weights are usually considered to be hyper-parameters of the training session and may be set manually by the operator designing the training session, or automatically for example by grid search or by using additional neural networks.

For the sake of explanation, images are considered as data type in various embodiments. However, it would be understood that the embodiments are also applicable to other media items, for example, videos and audio data.

It is to be understood that even in end-to-end learned approaches, there may be components which are not learned from data, such as an arithmetic codec.

Figure 10:
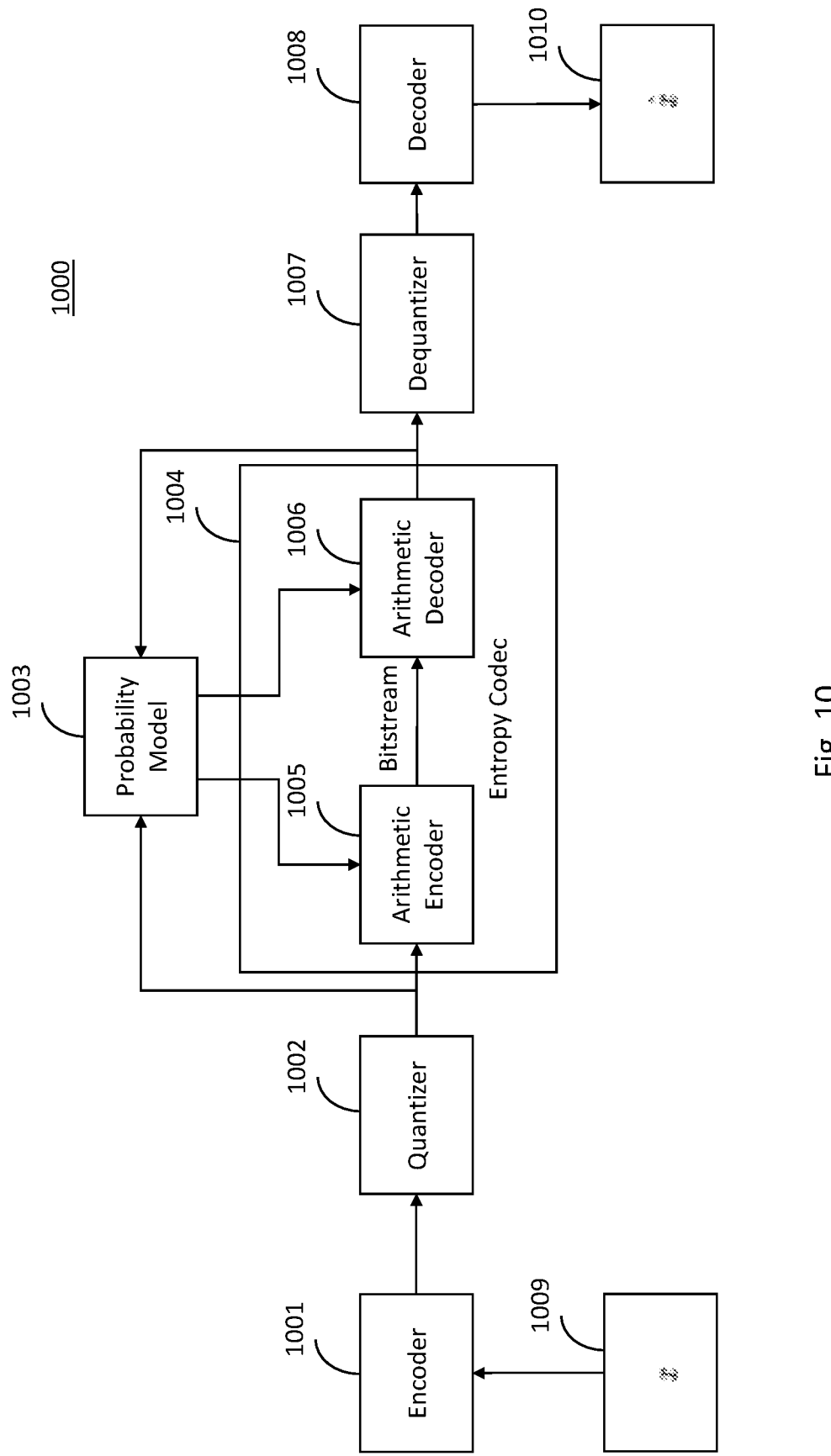
FIG. 10 is an example neural network-based end-to-end learned video coding system, in accordance with an example embodiment.

Option 2 is illustrated in FIG. 10, and it includes a different type of codec architecture. Referring to FIG. 10, it illustrates an example neural network-based end-to-end learned video coding system, in accordance with an example embodiment. As shown FIG. 10, a neural network-based end-to-end learned video coding system 1000 includes an encoder 1001, a quantizer 1002, a probability model 1003, an entropy codec 1004, for example, an arithmetic encoder 1005 and an arithmetic decoder 1006, a dequantizer 1007, and a decoder 1008. The encoder 1001 and the decoder 1008 are typically two neural networks, or mainly comprise neural network components. The probability model 1003 may also comprise neural network components. The quantizer 1002, the dequantizer 1007, and the entropy codec 1004 are typically not based on neural network components, but they may also potentially comprise neural network components. In some embodiments, the encoder, quantizer, probability model, entropy codec, arithmetic encoder, arithmetic decoder, dequantizer, and decoder, may also be referred to as an encoder component, quantizer component, probability model component, entropy codec component, arithmetic encoder component, arithmetic decoder component, dequantizer component, and decoder component respectively.

On the encoding side, the encoder 1001 takes a video/image as an input 1009 and converts the video/image in original signal space into a latent representation that may comprise a more compressible representation of the input. The latent representation may be normally a 3-dimensional tensor for image compression, where 2 dimensions represent spatial information and the third dimension contains information at that specific location.

Consider an example, in which the input data is an image, when the input image is a 128×128×3 RGB image (with horizontal size of 128 pixels, vertical size of 128 pixels, and 3 channels for the Red, Green, Blue color components), and if the encoder downsamples the input tensor by 2 and expands the channel dimension to 32 channels, then the latent representation is a tensor of dimensions (or 'shape') 64×64×32 (e.g, with horizontal size of 64 elements, vertical size of 64 elements, and 32 channels). Please note that the order of the different dimensions may differ depending on the convention which is used. In some embodiments, for the input image, the channel dimension may be the first dimension, so for the above example, the shape of the input tensor may be represented as 3×128×128, instead of 128×128×3.

In the case of an input video (instead of just an input image), another dimension in the input tensor may be used to represent temporal information.

The quantizer 1002 quantizes the latent representation into discrete values given a predefined set of quantization levels. The probability model 1003 and the arithmetic encoder 1005 work together to perform lossless compression for the quantized latent representation and generate bitstreams to be sent to the decoder side. Given a symbol to be encoded to the bitstream, the probability model 1003 estimates the probability distribution of possible values for that symbol based on a context that is constructed from available information at the current encoding/decoding state, such as the data that has already encoded/decoded. The arithmetic encoder 1005 encodes the input symbols to bitstream using the estimated probability distributions.

On the decoding side, opposite operations are performed. The arithmetic decoder 1006 and the probability model 1003 first decode symbols from the bitstream to recover the quantized latent representation. Then, the dequantizer 1007 reconstructs the latent representation in continuous values and pass it to the decoder 1008 to recover the input video/image. The recovered input video/image is provided as an output 1010. Note that the probability model 1003, in this system 1000, is shared between the arithmetic encoder 1005 and arithmetic decoder 1006. In practice, this means that a copy of the probability model 1003 is used at the arithmetic encoder 1005 side, and another exact copy is used at the arithmetic decoder 1006 side.

In this system 1000, the encoder 1001, the probability model 1003, and the decoder 1008 are normally based on deep neural networks. The system 1000 is trained in an end-to-end manner by minimizing the following rate-distortion loss function, which may be referred to simply as training loss, or loss:

$$L = D + \lambda R \qquad \text{equation 2}$$

In equation 2, D is the distortion loss term, R is the rate loss term, and is the weight that controls the balance between the two losses.

The distortion loss term may be referred to also as reconstruction loss. It encourages the system to decode data that is similar to the input data, according to some similarity metric. Following are some examples of reconstruction losses:

a loss derived from mean squared error (MSE);

a loss derived from multi-scale structural similarity (MS-SSIM), such as 1 minus MS-SSIM, or 1–MS-SSIM;

losses derived from the use of a pretrained neural network. For example, error(f1, f2), where f1 and f2 are the features extracted by a pretrained neural network for the input (uncompressed) data and the decoded (reconstructed) data, respectively, and error( ) is an error or distance function, such as L1 norm or L2 norm; and losses derived from the use of a neural network that is trained simultaneously with the end-to-end learned codec. For example, adversarial loss can be used, which is the loss provided by a discriminator neural network that is trained adversarially with respect to the codec, following the settings proposed in the context of generative adversarial networks (GANs) and their variants.

Multiple distortion losses may be used and integrated into D.

Minimizing the rate loss encourages the system to compress the quantized latent representation so that the quantized latent representation can be represented by a smaller number of bits. The rate loss may be computed on the output of the encoder NN, or on the output of the quantization operation, or on the output of the probability model. In one example embodiment, the rate loss may comprise multiple rate losses. Example of rate losses are the following:

a differentiable estimate of the entropy of the quantized latent representation, which indicates the number of bits necessary to represent the encoded symbols, for example, bits-per-pixel (bpp);

a sparsification loss, for example, a loss that encourages the output of the Encoder NN or the output of the quantization to have many zeros. Examples are L0 norm, L1 norm, L1 norm divided by L2 norm; and a cross-entropy loss applied to the output of a probability model, where the probability model may be a NN used to estimate the probability of the next symbol to be encoded by the arithmetic encoder 1005.

A similar training loss may be used for training the systems illustrated in FIG. 8 and FIG. 9.

For training one or more neural networks that are part of a codec, such as one or more neural networks in FIG. 8, FIG. 9 and/or FIG. 10, one or more of reconstruction losses may be used, and one or more of the rate losses may be used. The loss terms may then be combined for example as a weighted sum to obtain the training objective function. Typically, the different loss terms are weighted using different weights, and these weights determine how the final system performs in terms of rate-distortion loss. For example, when more weight is given to one or more of the reconstruction losses with respect to the rate losses, the system may learn to compress less but to reconstruct with higher accuracy as measured by a metric that correlates with the reconstruction losses. These weights are usually considered to be hyperparameters of the training session and may be set manually by the operator designing the training session, or automatically, for example, by grid search or by using additional neural networks.

In one example embodiment, the rate loss and the reconstruction loss may be minimized jointly at each iteration. In another example embodiment, the rate loss and the reconstruction loss may be minimized alternately, e.g., in one iteration the rate loss is minimized and in the next iteration the reconstruction loss is minimized, and so on. In yet another example embodiment, the rate loss and the reconstruction loss may be minimized sequentially, e.g., first one of the two losses is minimized for a certain number of iterations, and then the other loss is minimized for another number of iterations. These different ways of minimizing rate loss and reconstruction loss may also be combined.

It is to be understood that even in end-to-end learned approaches, there may be components which are not learned from data, such as an arithmetic codec.

For lossless video/image compression, the system 1000 contains the probability model 1003, the arithmetic encoder 1005, and the arithmetic decoder 1006. The system loss function contains the rate loss, since the distortion loss is always zero, in other words, no loss of information.

Video Coding for Machines (VCM)

Reducing the distortion in image and video compression is often intended to increase human perceptual quality, as humans are considered to be the end users, e.g. consuming or watching the decoded images or videos. Recently, with the advent of machine learning, especially deep learning, there is a rising number of machines (e.g., autonomous agents) that analyze or process data independently from humans and may even take decisions based on the analysis results without human intervention. Examples of such analysis are object detection, scene classification, semantic segmentation, video event detection, anomaly detection, pedestrian tracking, and the like. Example use cases and applications are self-driving cars, video surveillance cameras and public safety, smart sensor networks, smart TV and smart advertisement, person re-identification, smart traffic monitoring, drones, and the like. Accordingly, when decoded data is consumed by machines, a quality metric for the decoded data may be defined, which is different from a quality metric for human perceptual quality. Also, dedicated algorithms for compressing and decompressing data for machine consumption may be different than those for compressing and decompressing data for human consumption. The set of tools and concepts for compressing and decompressing data for machine consumption is referred to here as video coding for machines.

A decoder-side device may have multiple 'machines' or neural networks (NNs) for analyzing or processing decoded data. These multiple machines may be used in a certain combination which is, for example, determined by an orchestrator sub-system. The multiple machines may be used for example in temporal succession, based on the output of the previously used machine, and/or in parallel. For example, a video which was compressed and then decompressed may be analyzed by one machine (NN) for detecting pedestrians, by another machine (another NN) for detecting cars, and by another machine (another NN) for estimating the depth of objects in the frames.

An encoder-side device may encode input data, such as a video, into a bitstream which represents compressed data. The bitstream is provided to a 'decoder-side device'. The term 'receiver-side' or 'decoder-side' refers to a physical or abstract entity or device which performs decoding of compressed data, and the decoded data may be input to one or more machines, circuits or algorithms.

The encoded video data may be stored into a memory device, for example as a file. The stored file may later be provided to another device.

Alternatively, the encoded video data may be streamed from one device to another.

Figure 11:
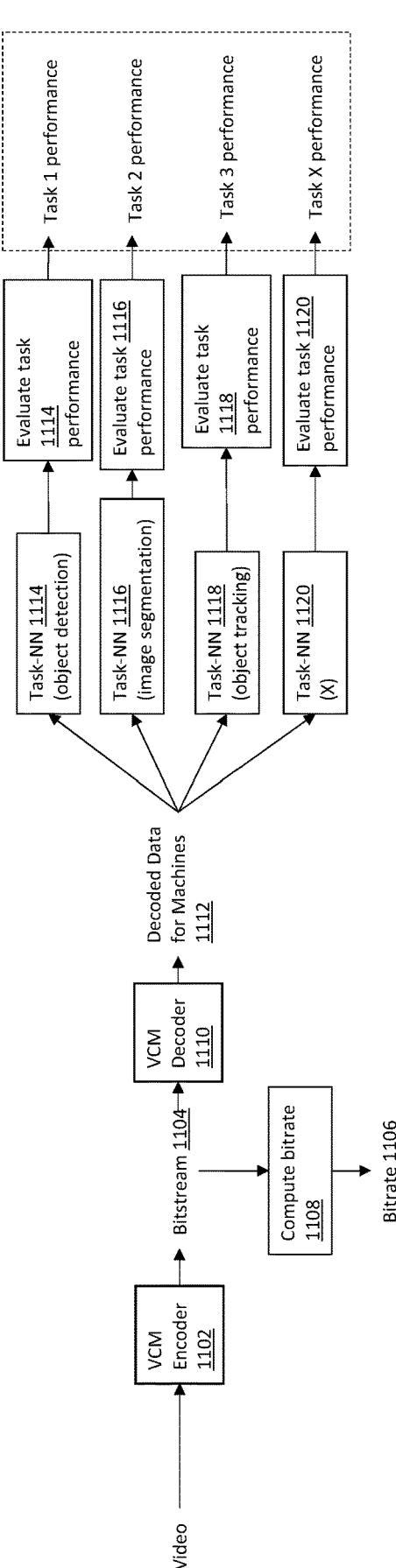
FIG. 11 illustrates a pipeline of video coding for machines (VCM), in accordance with an embodiment.

FIG. 11 illustrates a pipeline of video coding for machines (VCM), in accordance of an embodiment. A VCM encoder 1102 encodes the input video into a bitstream 1104. A bitrate 1106 may be computed 1108 from the bitstream 1104 in order to evaluate the size of the bitstream 1104. A VCM decoder 1110 decodes the bitstream 1104 output by the VCM encoder 1102. An output of the VCM decoder 1110 may be referred, for example, as decoded data for machines 1112. This data may be considered as the decoded or reconstructed video. However, in some implementations of the pipeline of VCM, the decoded data for machines 1112 may not have same or similar characteristics as the original video which was input to the VCM encoder 1102. For example, this data may not be easily understandable by a human, if the human watches the decoded video from a suitable output device such as a display. The output of VCM decoder 1110 is then input to one or more task neural network (task-NN). For the sake of illustration, FIG. 11 is shown to include three example task-NNs, a task-NN 1114 for object detection, a task-NN 1116 for image segmentation, a task-NN 1118 for object tracking, and a non-specified one, task-NN 1120 for performing task X. The goal of VCM is to obtain a low bitrate while guaranteeing that the task-NNs still perform well in terms of the evaluation metric associated to each task.

Figure 12:
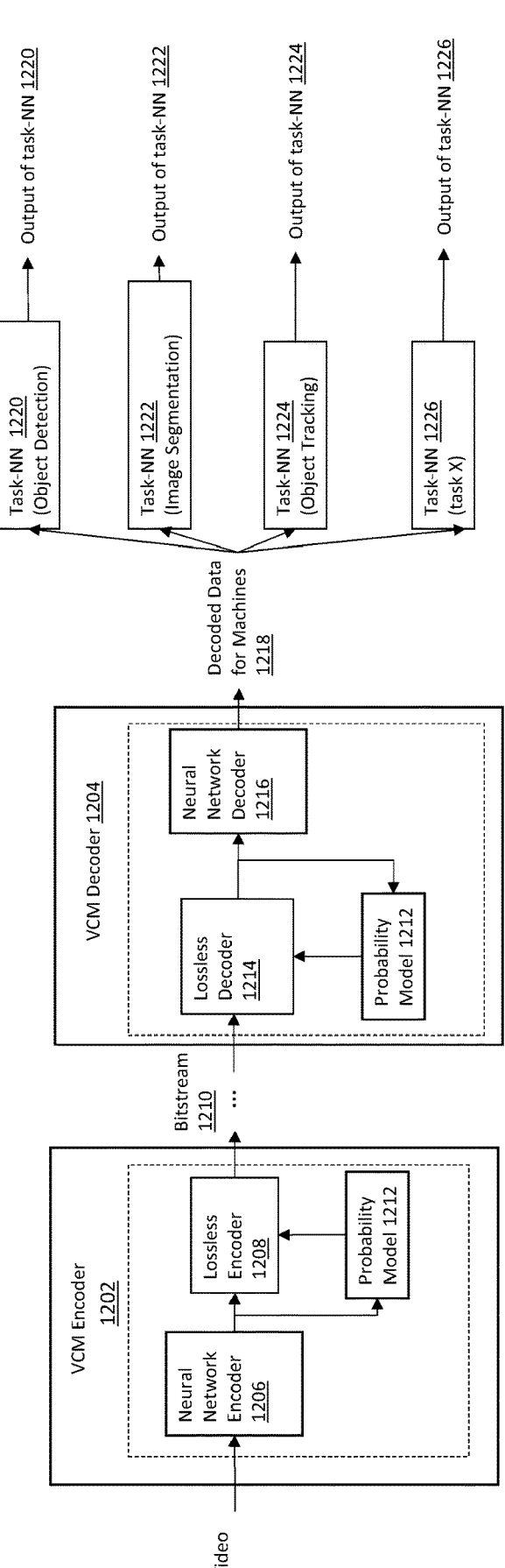
FIG. 12 illustrates an example of an end-to-end learned approach for the use case of video coding for machines, in accordance with an embodiment.

One of the possible approaches to realize video coding for machines is an end-to-end learned approach. FIG. 12 illustrates an example of an end-to-end learned approach, in accordance with an embodiment. In this approach, the VCM encoder 1202 and VCM decoder 1204 mainly consist of neural networks. The video is input to a neural network encoder 1206. The output of the neural network encoder 1206 is input to a lossless encoder 1208, such as an arithmetic encoder, which outputs a bitstream 1210. The lossless codec may take an additional input from a probability model 1212, both in the lossless encoder 1208 and in a lossless decoder 1214, which predicts the probability of the next symbol to be encoded and decoded. The probability model 1212 may also be learned, for example it may be a neural network. At a decoder-side, the bitstream 1210 is input to the lossless decoder 1214, such as an arithmetic decoder, whose output is input to a neural network decoder 1216. The output of the neural network decoder 1216 is the decoded data for machines 1218, that may be input to one or more task-NNs, e.g., a task-NN 1220 for object detection, a task-NN 1222 for object segmentation, a task-NN 1224 for object tracking, and a non-specified one, a task-NN 1226 for performing task X.

Figure 13:
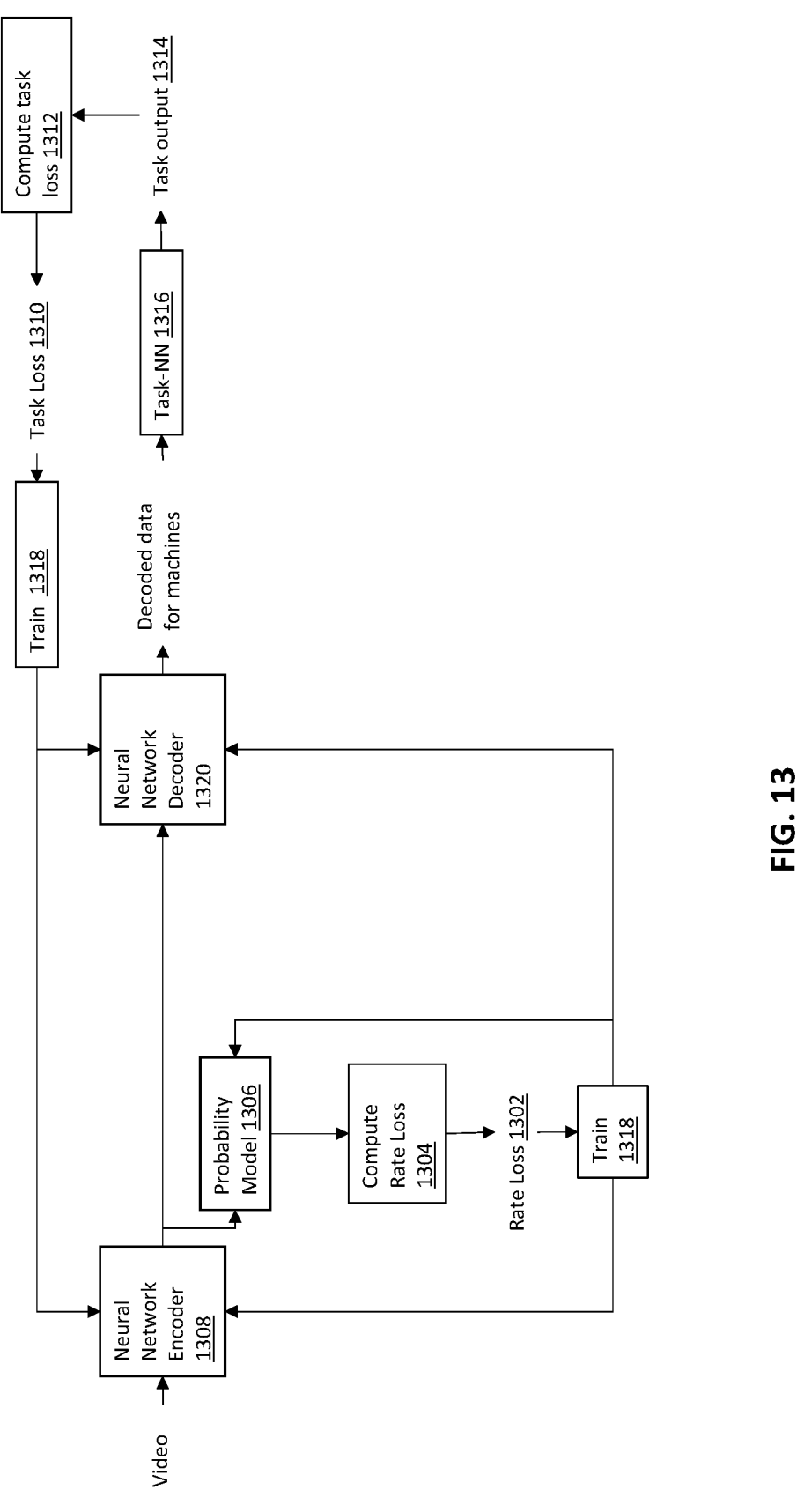
FIG. 13 illustrates an example of how the end-to-end learned system may be trained for the use case of video coding for machines, in accordance with an embodiment.

FIG. 13 illustrates an example of how the end-to-end learned system may be trained, in accordance with an embodiment. For the sake of simplicity, this embodiment is explained with help of one task-NN. However, it may be understood that multiple task-NNs may be similarly used in the training process. A rate loss 1302 may be computed 1304 from the output of a probability model 1306. The rate loss 1302 provides an approximation of the bitrate required to encode the input video data, for example, by a neural network encoder 1308. A task loss 1310 may be computed 1312 from a task output 1314 of a task-NN 1316.

The rate loss 1302 and the task loss 1310 may then be used to train 1318 the neural networks used in the system, such as a neural network encoder 1308, a probability model, a neural network decoder 1320. Training may be performed by first computing gradients of each loss with respect to the trainable parameters of the neural networks that are contributing or affecting the computation of that loss. The gradients are then used by an optimization method, such as Adam, for updating the trainable parameters of the neural networks.

Another possible approach to realize video coding for machines is to use a video codec which is mainly based on traditional components, that is components which are not obtained or derived by machine learning means. For example, H.266/VVC codec can be used. However, some of the components of such a codec may still be obtained or derived by machine learning means. In one example, one or more of the in-loop filters of the video codec may be a neural network. In another example, a neural network may be used as a post-processing operation (out-of-loop). A neural network filter or other type of filter may be used in-loop or out-of-loop for adapting the reconstructed or decoded frames in order to improve the performance or accuracy of one or more machine neural networks.

In some implementations, machine tasks may be performed at decoder side (instead of at encoder side). Some reasons for performing machine tasks at decoder side include, for example, the encoder-side device may not have the capabilities (computational, power, memory, and the like) for running the neural networks that perform these tasks, or some aspects or the performance of the task neural networks may have changed or improved by the time that the decoder-side device needs the tasks results (e.g., different or additional semantic classes, better neural network architecture). Also, there may be a customization need, where different clients would run different neural networks for performing these machine learning tasks.

Example embodiments consider end-to-end learned video compression, e.g., the approach where most of the components of the codec are learned from data. In some example embodiments, the learned components may be neural networks.

Some example embodiments, consider the case where the video compression process is split between the following, but not limited, two sub-processes that may be performed by two separate sub-systems:

Intra-frame compression, which may be end-to-end learned; and

End-to-end learned compression of predicted frames, where the predicted frames may be bidirectionally-predicted frames, unidirectionally-predicted frames, or some predicted frames are bidirectionally-predicted and some are unidirectionally-predicted. For bidirectionally-predicted frames, this refers to compressing a frame which is predicted from two reference frames, where one reference frame may be before the predicted frame and another reference frame may be after the predicted frame in playback/display order. For unidirectionally-predicted frames, this refers to one reference frame that may be before the predicted frame. The reference frame(s) may belong to one of the following categories:

Intra frame;

Bidirectionally-predicted frame ("B frame", or "B-predicted frame"); or

Unidirectionally-predicted frame ("P frame", or "Predicted frame")

Some example embodiments provide an end-to-end learned compression of predicted frames sub-process.

One example problem comprises how to estimate motion field implicitly rather than explicitly.

Another example problem comprises how to use reference frames as context to the probability model used in the entropy codec.

Yet another example problem comprises how intra frames can be utilized for compressing and/or decompressing B frames or P frames.

Still another problem comprises how to use a uniformed architecture for compressing and/or decompressing both B frames and P frames.

Various embodiments propose end-to-end learned compression of bidirectionally-predicted or unidirectionally-predicted frames.

One proposed example embodiment includes estimating and using implicit motion information for compression of bidirectionally-predicted or unidirectionally-predicted frames, rather than explicit motion information (such as optical flow). In this embodiment, the neural network which estimates the implicit motion information is trained jointly with the rest of the learnable components of the sub-system performing compression of B frames or P frames. An example benefit of this proposed embodiment is that it automatically and optimally distributes bits among implicit motion information and prediction-residual information.

Another proposed example embodiment includes, a bridge network, or a bridge NN, which is part of an encoder. The proposed bridge NN takes in reference frame(s) and the target frame (the frame to be predicted) and outputs a latent tensor that comprises both residual and implicit motion information using multiple scales. The use of multiple scales significantly improves the extraction of useful information for the decompression step happening at decoder side, compared to solutions that use an original scale.

Yet another proposed example embodiment includes providing features extracted from reference frame(s), as extra context information for the probability model used in the entropy codec. In some existing solutions, recurrent neural network architectures (RNN) are used in order to collect temporal context information. RNNs involve long training times, high computational and memory complexity, and may be affected by gradient vanishing problem during training which negatively impacts the training convergence time and the performance of the final trained model. The proposed example embodiment, simplifies the design of this part of the codec, thus avoiding the above mentioned limitations of RNNs.

Still another proposed example embodiment includes a method for effectively exploiting the high-quality information of intra-coded frames for enhancing the reconstruction of B frames or P frames. Typically, when predicting a B frame from two reference frames, two temporary versions of the B frame are predicted, and these two temporary versions of the B frame are then combined by a combiner block or circuit or a combiner NN in order to obtain the final prediction for the B frame. In the proposed embodiment, information about the intra frames is provided as extra input to the combiner NN. This design brings improvements in reconstruction of the predicted B frame, without significantly increasing the size of the decoder.

Still another proposed embodiment includes providing a temporal information of the references frame(s), e.g. the temporal distance between the reference frame and the B or P frame, as an extra input of the encoder, the decoder, and the probability model. The temporal information also gives indication of whether the system is used for P frame or B frame compression.

Still another proposed embodiment includes a resetting mechanism for the hidden state of the RNN, e.g., when the distance of the current reference frame is substantially far from the temporal context frame, the hidden state variable of the RNN could be reset to allow learning new context.

Following sections describe the proposed embodiments in detail.

General Setup

Various embodiments focus on an end-to-end learned video compression, e.g., the approach where components of the codec are learned from data. In an example embodiment, the learned components may be neural networks.

Some embodiments consider the case where the video compression process may be split between the following, but not limited to, two sub-processes: intra-frame coding, inter-frame coding. In an example embodiment, intra-frame coding may be applied on one frame every N frames, and inter-frame coding may be applied on all frames between two intra-coded frames. For example, the intra period N may be equal to 8, so a first frame (with index 0) of the video sequence would be coded using intra-frame codec, the next 7 frames (with indexes from 1 to 7) of the video sequence would be coded using inter-frame codec, the next one frame (with index 8) of the video sequence would be coded using intra-frame codec, and so on. In some embodiments, the intra-coded frames may be referred to as intra frames, or as intra-predicted frames; and the inter-coded frames may be referred to as inter-frames, inter-predicted frames, or predicted frames. The frequency period for applying intra-coding may not be constant within a video sequence and among different video sequences. In some embodiments, an adaptive process may determine the optimal intra-frame period for a sequence, or the optimal frames on which to apply intra-frame coding. The proposed embodiments are not limited to any specific method used to determine when the intra-coding and the inter-coding are performed.

Figure 14:
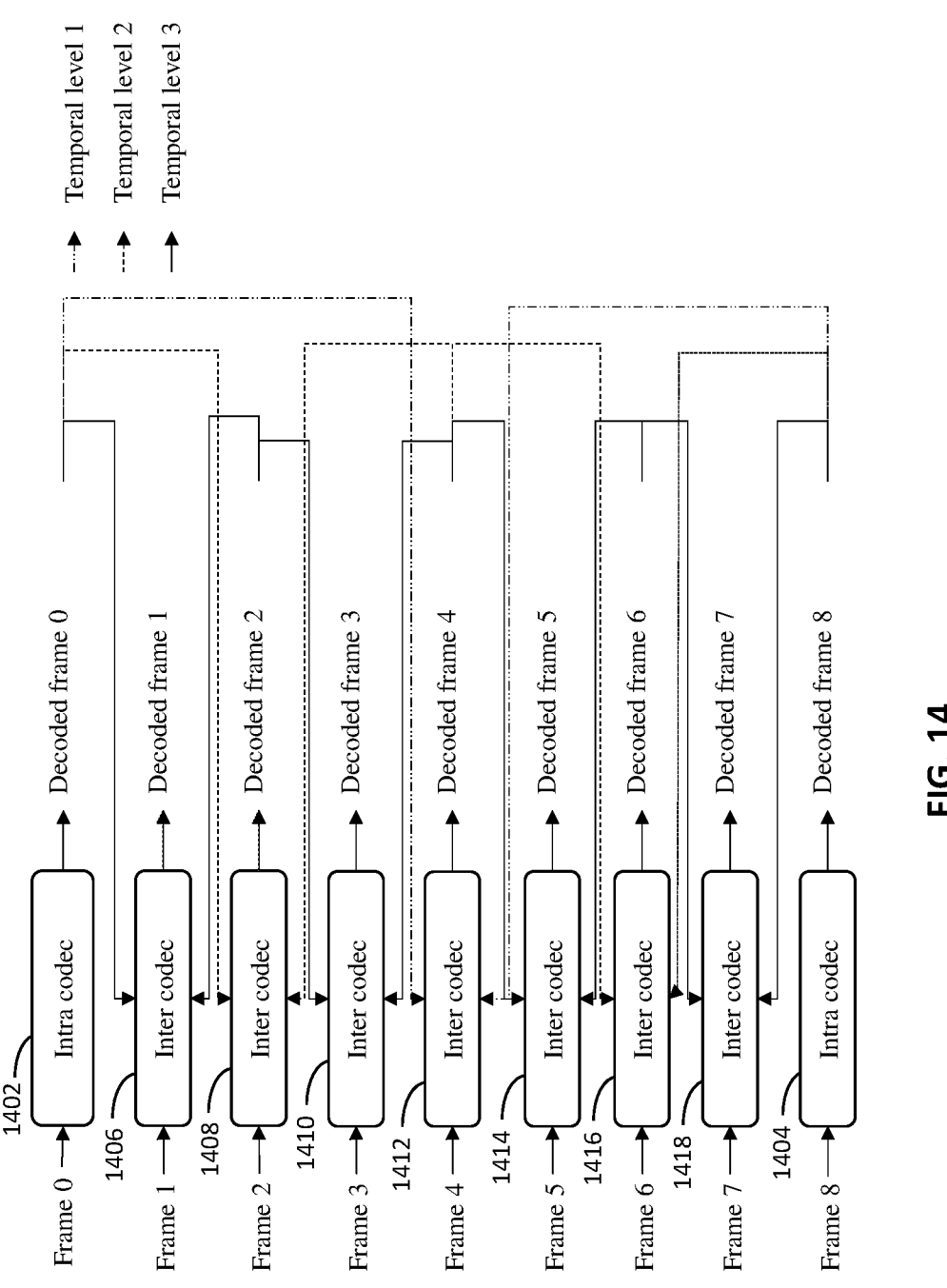
FIG. 14 illustrates an example overview for coding a video sequence, in accordance with an embodiment.

Referring to FIG. 14, it illustrates an example overview for coding a video sequence, in accordance with an embodiment. This example illustrates usage of intra-codec (e.g. an intra-codec 1402 and an intra-codec 1404) and inter-codec (e.g. an inter-codec 1406 to an inter-codec 1418) for coding a video sequence of 9 frames (e.g. a frame 0 to frame 8), with an intra period of N=8.

'Temporal level' in FIG. 14 refers to which reference frames are used for predicting a frame in the inter-codec. In some embodiments, inter-codec may be referred to as inter-frame codec or inter-frame coding. Reference frames are decoded frames that are used for predicting other frames. FIG. 14 considers the example of using three temporal levels, however, the proposed embodiments are not limited to the number of temporal levels, or to how the reference frames are selected. Temporal level 1 refers to predicting a B frame within the inter-codec from two intra frames as reference frames, e.g., predicting frame 4 from decoded frame 0 and decoded frame 8. Temporal level 2 refers to predicting a B frame within the inter-codec from one intra frame as one reference frame and one B frame as another reference frame, e.g., predicting frame 2 from decoded frame 0 and decoded frame 4, or predicting frame 6 from decoded frame 8 and decoded frame 4. Temporal level 3 refers to predicting a B frame within the inter-codec from either two B frames as reference frames, or one intra frame as one reference frame and one B frame as another reference frame, e.g., predicting frame 1 from decoded frame 0 and decoded frame 2, or predicting frame 3 from decoded frame 2 and decoded frame 4, or predicting frame 5 from decoded frame 4 and decoded frame 6, or predicting frame 7 from decoded frame 6 and decoded frame 8.

Sub-process 1: intra-frame coding: This refers to compressing and decompressing a video frame by using only information contained in that video frame. In an embodiment, this sub-process may be end-to-end learned, for example, it may be an end-to-end learned image compression system. In another embodiment, it may be realized in other ways, such as a more traditional image codec (for example JPEG codec, or JPEG2000 codec) or intra-frame codec (such as BPG, or intra-mode compression of H.265/HEVC, or intra-mode compression of H.266/VVC).

Figure 15:
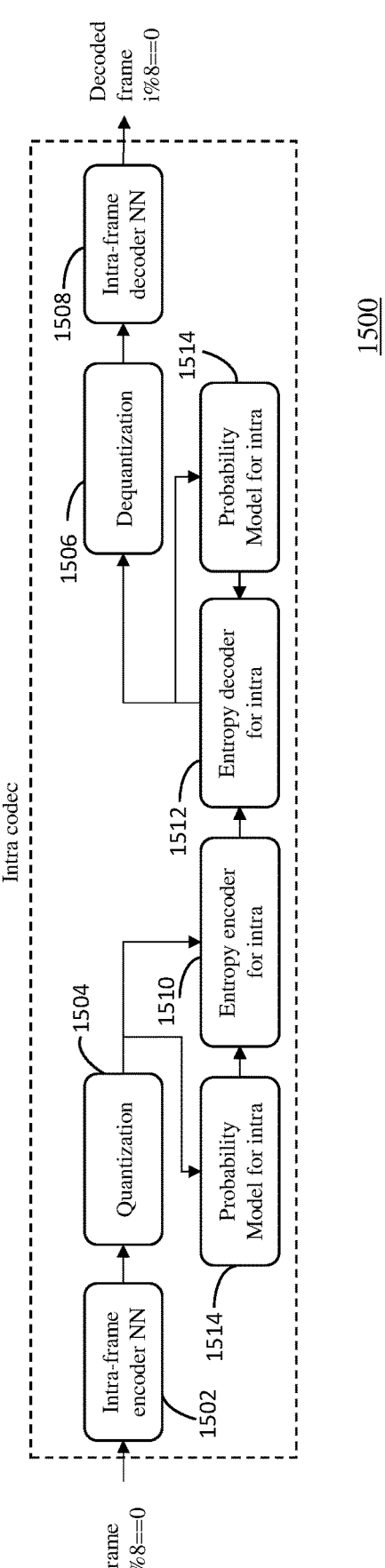
FIG. 15 illustrates a high-level overview of an example end-to-end learned image codec, which can be used as an intra-codec block or circuit, in accordance with an embodiment.

Referring now to FIG. 15, it illustrates a high-level overview of an example end-to-end learned image codec, which can be used as an intra-codec block or circuit 1500, in accordance with an embodiment.

In FIG. 15, the intra-codec block or circuit 1500 is applied every 8 frames. "%" represents the modulo operator. "i" represents the index of the frame within the video sequence, so "i %8==0" is an expression indicating that the intra-codec is applied with a period of 8 frames, because 0 modulo 8 is equal to 0, 8 modulo 8 is equal to 0, 16 modulo 8 is equal to 0, and so on.

Intra-frame encoder NN block or circuit 1502 may be one or more neural networks that transform the input frame into a more compressible signal, for example, a signal with lower entropy, and/or a signal that is more robust to compression operations such as sparsification and quantization. For example, the intra-frame encoder NN 1502 may be a convolutional neural network, such as the encoder part of a neural auto-encoder architecture. Example layers of such a neural network may be convolutional layers, normalization layers, non-linear activation function layers such as Rectified Linear Unit (ReLU), and the like. The output of this module may be referred to as latent features, or latent representation.

A quantization block or circuit 1504 may be a module performing a quantization operation, e.g., reducing the representational precision of the input signal, for example, from 32 bits floating-point values to 8 bits fixed-point values. Any suitable quantization algorithm may be used, such as a uniform scalar quantization, a codebook-based quantization, a learned quantization, and the like. The output of this module may be referred to as quantized latent features, or quantized latent representation.

A dequantization block or circuit 1506 may be a module performing the inverse operation, or an approximation of an inverse operation, of the quantization block or circuit 1504. The input is the quantized latent representation, and the output is the dequantized latent representation.

An intra-frame decoder NN block or circuit 1508 may be one or more neural networks that transform the input signal into a decoded or reconstructed frame. The input is the dequantized latent representation. In one embodiment, the decoded or reconstructed frame may be a frame that has a similar visual appearance as the input frame to the intra-codec, for example, in the case where the decoded frames are meant to be shown to humans. In another embodiment, the decoded or reconstructed frame may be a frame that has a different visual appearance than the input frame to the intra-codec, for example, it may be a frame that is input to an algorithm performing a certain task, such as another neural network performing object recognition, this is an example of video coding for machines (VCM). For example, the intra-frame decoder NN block or circuit 1508 may be a deconvolutional neural network, such as the decoder part of a neural auto-encoder architecture. Example layers of such a neural network may be transpose convolutional layers, convolutional layers, upsampling layers, normalization layers, non-linear activation function layers such as Rectified Linear Unit (ReLU), and the like.

An entropy encoder for intra block or circuit 1510 may be a lossless encoder based on entropy, for example, an arithmetic encoder. It may take in the quantized latent features and outputs a bitstream that represents the compressed version of the input frame. The entropy encoder for intra block or circuit 1510 may also take an auxiliary input from a probability model.

An entropy decoder for intra block or circuit 1512 may be a lossless decoder based on entropy, for example, an arithmetic decoder. It takes in the bitstream and may output lossless-decoded quantized latent features. The entropy decoder for intra block or circuit 1512 may also take an auxiliary input from a probability model.

A Probability model for intra block or circuit 1514 takes in the quantized latent features or the lossless-decoded quantized latent features, and outputs a probability estimate for one or more elements of the input. This output is provided as auxiliary input to the entropy encoder for intra block or circuit 1510 for lossless encoding and to the entropy decoder for intra block or circuit 1512 for lossless decoding. As shown in FIG. 15, the probability model for intra block or circuit 1514 is part of both encoder-side and decoder-side, so same or substantially same module needs to be replicated and utilized at both sides.

The intra-codec block or circuit 1500 may be trained by using a training dataset and a training algorithm. The training dataset may be a dataset of images. The training algorithm may comprise an iterative algorithm. At each iteration, images from the training dataset are input to the intra-codec block or circuit 1500. The output decoded images may be used for computing one or more reconstruction losses, such as MSE. The output of the probability model for intra block or circuit 1514 and/or the output of the intra-frame encoder NN block or circuit 1502 and/or the output of the quantization block or circuit 1504 may be used for computing one or more rate losses Minimizing the one or more reconstruction losses may increase the visual quality of the decoded frame Minimizing the one or more rate losses may decrease the number of bits that are needed for representing the compressed version of the input frame. The minimization of the losses is performed by computing gradients of the two or more loss functions with respect to the learnable parameters of one or more neural networks in the intra-codec, and then using these gradients for updating the one or more neural networks by using an optimization routine such as stochastic gradient descent (SGD).

Sub-process 2: inter-frame coding. This refers to compressing and decompressing a video frame by using one or more other frames which have been already compressed and decompressed, where these one or more other frames are referred to as reference frames. Usually, inter-frame coding may be categorized into coding of P frames, where a single reference frame is used, and coding of B frames, where two reference frames are used. In various embodiments, for the sake of simplicity, the coding of B-predicted frames is considered. However, it is to be understood that extending the embodiments to the case of coding of P-predicted frames is also within the scope of these embodiments and may be achieved by a person skilled in the art. In the examples of coding of B frames, the frame to be predicted may be referred to as B frame, or target frame. The reference frames may be a frame before the B frame and the frame after the B frame, in playback/display order. These reference frames are assumed to have already been compressed and decompressed when they are used for predicting the B frame. Coding of B frames may be achieved in several ways. One approach is to use algorithms which are not learned from data, as in H.266/VVC. Another approach is to use a sub-system that comprises mainly algorithms which are learned from data, such as neural networks, this latter approach is commonly referred to as end-to-end learned coding of bidirectionally-predicted frames. A third approach, here referred to as mixed approach, is to use a subsystem which is partly based on non-learned algorithms from codecs such as H.266/VVC and partly based on learned algorithms such as neural networks. Various embodiments described herein target the end-to-end learned coding of bidirectionally-predicted frames. However, some of the proposed embodiments may be applied to one or more learned algorithms in the mixed approach. Each of the two reference frames may belong to one of the following categories:

Intra frame;

Bidirectionally-predicted frame ('B frame', or 'B-predicted frame'); or

Unidirectionally-predicted frame.

Some embodiments focus on the sub-process 2, e.g., end-to-end learned compression of B-predicted frame sub-process, which is performed by an inter-codec.

Figure 16:
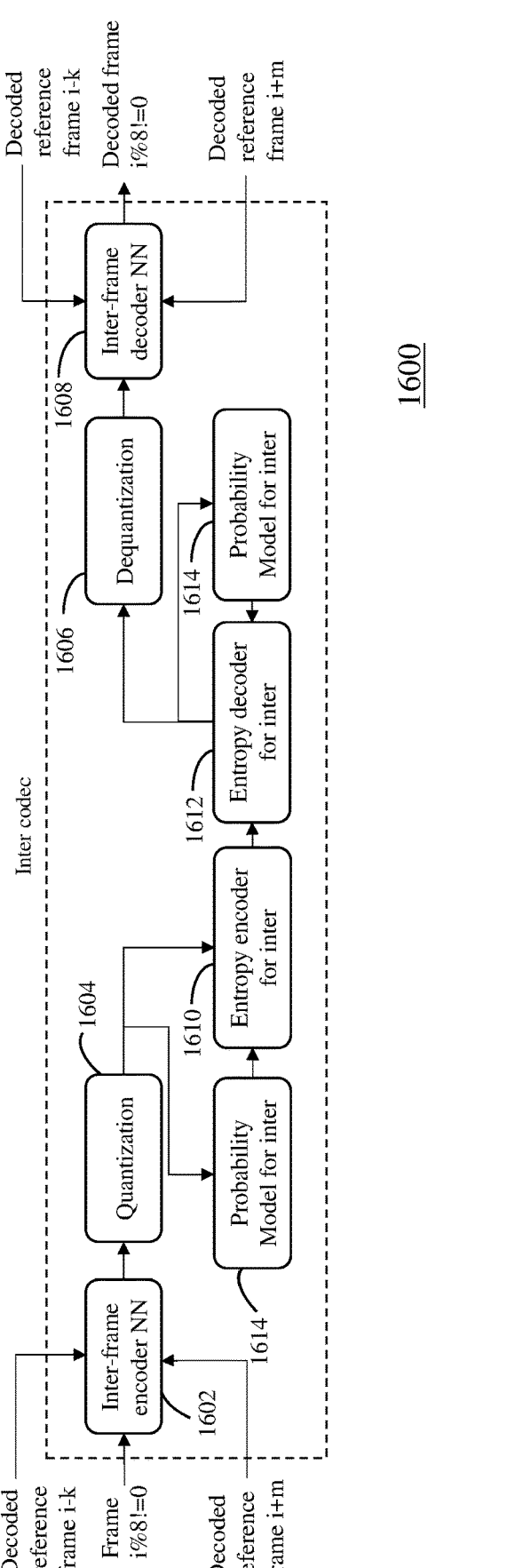
FIG. 16 illustrates a high-level overview of an inter-codec block or circuit, in accordance with an embodiment.

Referring now to FIG. 16, it illustrates a high-level overview of an inter-codec block or circuit 1600, in accordance with an embodiment. In FIG. 16, the inter-codec block or circuit 1600 is applied on each of the 8 frames which are between two consecutive intra frames. "%" represents the modulo operator. "i" represents the index of the frame within the video sequence. The expression "i %8!=0" indicates that the inter-codec is applied on frames whose index "i" is not a multiple of 8, i.e., whose index "i" module 8 is different than 0. Decoded reference frame i−k and decoded reference frame i+m refer to the reference frames for the i-th frame, where k and m are two integer numbers and may be selected according for example to the temporal level of the i-th B-frame.

An inter-frame encoder NN block or circuit 1602 may be one or more neural networks that transform the input frame into a more compressible signal, for example, a signal with lower entropy, and/or a signal that is more robust to compression operations such as sparsification and quantization. For example, the inter-frame encoder NN block or circuit 1602 may be a convolutional neural network, such as the encoder part of a neural auto-encoder architecture. Example layers of such a neural network may be convolutional layers, normalization layers, non-linear activation function layers such as Rectified Linear Unit (ReLU), and the like. The output of this module may be referred to as latent features, or latent representation. However, various embodiments propose an advanced architecture of the inter-codec, as described in FIG. 17.

A quantization block or circuit 1604 may perform a quantization operation, e.g., reducing the representational precision of the input signal, for example, from 32 bits floating-point values to 8 bits fixed-point values. Any suitable quantization algorithm may be used, such as uniform scalar quantization, codebook-based quantization, learned quantization, and the like. The output of this module may be referred to as quantized latent features, or quantized latent representation.

A dequantization block or circuit 1606 may module perform the inverse operation, or an approximation of an inverse operation, of the quantization block or circuit 1604. The input is the quantized latent representation, and the output is the dequantized latent representation.

An inter-frame decoder NN block or circuit 1608 may be one or more neural networks that transform the input signal into a decoded or reconstructed frame. The input is the dequantized latent representation. In an embodiment, the decoded or reconstructed frame may be a frame that has a similar visual appearance as the input frame to the intra-codec, for example, in the case where the decoded frames are meant to be shown to humans. In another embodiment, the decoded or reconstructed frame may be a frame that has a different visual appearance than the input frame to the inter-codec, for example, it could be a frame that is input to an algorithm performing a certain task, such as another neural network performing object recognition, this is the case of video coding for machines (VCM). For example, the inter-frame decoder NN block or circuit 1608 may be a deconvolutional neural network, such as the decoder part of a neural auto-encoder architecture. Example layers of such a neural network may be transpose convolutional layers, convolutional layers, upsampling layers, normalization layers, non-linear activation function layers such as Rectified Linear Unit (ReLU), and the like. Furthermore, in some embodiments, use of additional inputs, such as the decoded intra frames is proposed.

An entropy encoder for inter block or circuit 1610 may be a lossless encoder based on entropy, such as an arithmetic encoder. It may take in the quantized latent features and outputs a bitstream that represents the compressed version of the input frame. The entropy encoder for inter block or circuit 1610 may also take an auxiliary input from a probability model.

An entropy decoder for inter block or circuit 1612 may be a lossless decoder based on entropy, such as an arithmetic decoder. It takes in the bitstream and may output lossless-decoded quantized latent features. The entropy decoder for inter block or circuit 1612 may also take an auxiliary input from a probability model.

A probability model for inter block or circuit 1614 is a module that takes in the quantized latent features or the lossless-decoded quantized latent features, and outputs a probability estimate for one or more elements of the input. This output is provided as auxiliary input to the entropy encoder for inter block or circuit 1610 for lossless encoding and to the entropy decoder for inter block or circuit 1612 for lossless decoding. As shown in FIG. 16, the probability model for inter block or circuit 1614 is part of both encoder-side and decoder-side, so the same or substantially same module needs to be replicated and utilized at both sides.

The inter-codec block or circuit 1600 may be trained by using a training dataset and a training algorithm. The training dataset may comprise video frames. The training algorithm may comprise an iterative algorithm. At each iteration, frames from the training dataset are input to the inter-codec block or circuit 1600. The output decoded frame may be used for computing one or more reconstruction losses, such as MSE. The output of the probability model for inter block or circuit 1614 may be used for computing one or more rate losses Minimizing the one or more reconstruction losses may increase the visual quality of the decoded frame Minimizing the one or more rate losses may decrease the number of bits that are needed for representing the compressed version of the input frame. The minimization of the losses is performed by computing gradients of the two or more loss functions with respect to the learnable parameters of one or more neural networks in the inter-codec, and then using these gradients for updating the one or more neural networks by using an optimization routine such as SGD.

Training Aspects of the Video Compression System

The two sub-systems above may first be trained separately (this process may be here referred to as pretraining), and then further trained jointly (this process may be here referred to as finetuning). Alternatively, they can directly be trained jointly.

In one embodiment, the inter-codec may be pretrained by using uncompressed reference frames instead of decoded reference frames.

In another embodiment, the inter-codec may be pretrained first by using uncompressed reference frames instead of decoded reference frames, and then by using decoded reference frames.

In yet another embodiment, the inter-codec may be trained by assigning higher weighting coefficients to the one or more rate losses when the input frames are those belonging to the higher temporal levels, for example, for the frames with indexes 1, 3, 5, 7 (with respect to each intra-coding period), compared to the weighting coefficients assigned to the one or more rate losses when the input frames are those belonging to the lower temporal levels, for example, for the frames with indexes 2, 4, 6. Generally, values of the weighting coefficients assigned to the one or more rate losses may be directly proportional to the temporal level.

Detailed Architecture of the Inter-Codec

Figure 17:
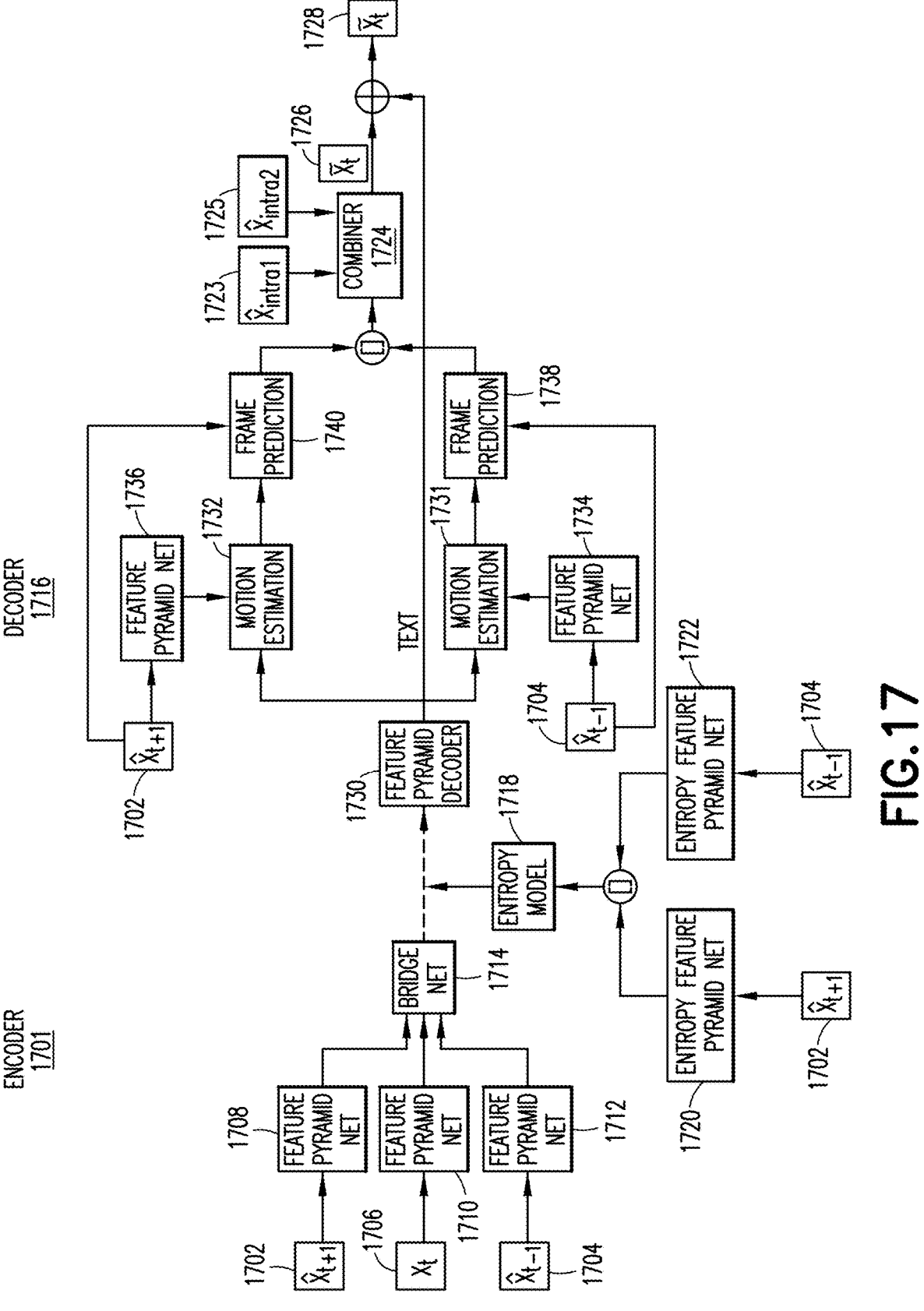
FIG. 17 illustrates a detailed architecture of the inter-codec block or circuit, in accordance with an embodiment.

Now referring to FIG. 17, it illustrates a detailed architecture 1700 of the inter-codec block or circuit 1600.

Inputs to an encoder block or circuit 1701 are two reference frames 1702 and 1704; and a target B frame 1706. The two reference frames 1702 and 1704 may be reconstructed intra-frames, P frames, B frames or any combination of these types. Feature pyramid net block or circuit (e.g. feature pyramid net blocks or circuits 1708, 1710, and 1712) extracts multi-scale features from an input frame. The multi-scale features are aggregated by the bridge net block or circuit 1714 and converted to a latent representation that may be used by a decoder block or circuit 1716 to reconstruct the target frame based on the reference frames.

An entropy model block or circuit 1718 is responsible for quantizing, compressing and converting the latent representation to a bitstream. To improve compression performance, the entropy model block or circuit 1718 enriches the context for the probability distribution estimation of the latent representation by using the features generated from the two reference frames 1702 and 1704 by entropy feature pyramid net blocks or circuits 1720 and 1722 respectively.

The decoder block or circuit 1716 takes the compressed bitstream of the latent representation as its input. The bitstream is first decompressed and dequantized to generate a reconstruction of the latent representation by the entropy model block or circuit 1718. Like the encoding process, the entropy model block or circuit 1718 also uses the features from the reference frames as an auxiliary context for the probability distribution estimation.

The latent representation is implicitly embedded with motion information and residuals. Frame prediction blocks or circuits, (e.g. frame prediction blocks and circuits 1738 and 1740), in the decoder block or circuit 1716 use the motion information to warp the reference frames (example, the reference frames 1702 and 1704) to generate predictions of a target frame. The predicted target frames, based on the reference frames, together with two reconstructed intra-coded frames (e.g. reconstructed intra-coded frames 1723 and 1725), are combined by a combiner block or circuit 1724 (may also be referred to as combiner NN block or circuit in some example embodiments) to produce a final prediction of a target frame 1726. Then, the residual is added to the final prediction of the target 1726 to generate a final reconstructed target frame 1728. In an embodiment, the reconstructed intra-coded frames are optional. For example:

Inside the combiner block or circuits 1724, the inputs are concatenated and used as input to some neural network layers;

The outputs of the frame prediction blocks or circuits 1738 and 1740 are blended, i.e., combined for example by linear combination;

The blended signal and the output of the neural network layers are summed together;

The output of the sum represents the final prediction of the target frame, which is the output of the combiner NN block or circuit 1724, and which may be different from the final reconstructed target frame; and The final reconstructed frame is obtained by adding the residual (one of the three outputs of the feature pyramid decoder block or circuit 1730) to the output of the combiner NN block or circuit 1724.

A feature pyramid decoder block or circuit 1730 takes the reconstructed latent representation as its input and generates of multi-scale motion features and one residual output.

A motion estimation block or circuit (e.g. motion estimation blocks or circuits 1731 or 1732) is responsible for motion estimation based on the two sets of multi-scale features. One set of the multi-scale features is an output from the feature pyramid decoder 1730. The other set is generated from the reference frame (e.g. the reference frame 1702 or 1704) using a feature pyramid net blocks or circuits (e.g. a feature pyramid net block or circuit 1734 or 1736). The motion estimation may be achieved by a typical motion estimation neural network, for example, FlowNet [https://arxiv.org/abs/1504.06852]. After the motion estimation, the inter-codec system generates a prediction of the target frame from the reference frame 1702 and 1704 by using a warping operation performed by frame prediction blocks or circuits 1738 and 1740 respectively.

The two predicted target frames, together with two reconstructed intra-coded frames, are combined by the combiner block or circuit 1724 to generate a final prediction of target frame 1726. The output of the combiner block or circuit 1724 is added to the residual output of the feature pyramid decoder 1730 to generate the final reconstructed target frame 1728.

Implicit Motion Estimation

An example embodiment comprises estimating and using implicit motion information rather than explicit motion information (such as optical flow). One of the difficulties for the explicit motion information is the automatic bit allocation between the motion information and the residual information. This embodiment proposes to perform a motion estimation on the decoder side given the implicit information from the encoder. The prediction of the target frame from a reference frame is performed by warping the reference frame using the motion estimation at the decoder side. The system can be end-to-end trained to optimize motion estimation and automatic bit allocation simultaneously.

Since a multi-scale setup can give a better motion estimation, a feature pyramid decoder block or circuit (e.g. the feature pyramid decoder block or circuit 1730) is used to generate multi-scale features from the reconstructed latent representation. The multi-scale features, together with features generated from the reference frame, are given to a motion estimation block or circuit (e.g. the motion estimation block or circuit 1731 or 1732) to estimate the motion of the reference frame.

Bridge Network

An example embodiment, describes a bridge network, or a bridge NN, which is part of the encoder. The multi-scale features generated from the reference frames and the target frames are aggregated by the bridge network. This embodiment proposes to use the multi-scale aggregation to help the information follow of a deep convolutional neural network. The proposed architecture also makes it possible to share the weights of multiple feature pyramid networks in the system, which can dramatically reduce the size of the system.

Figure 18:
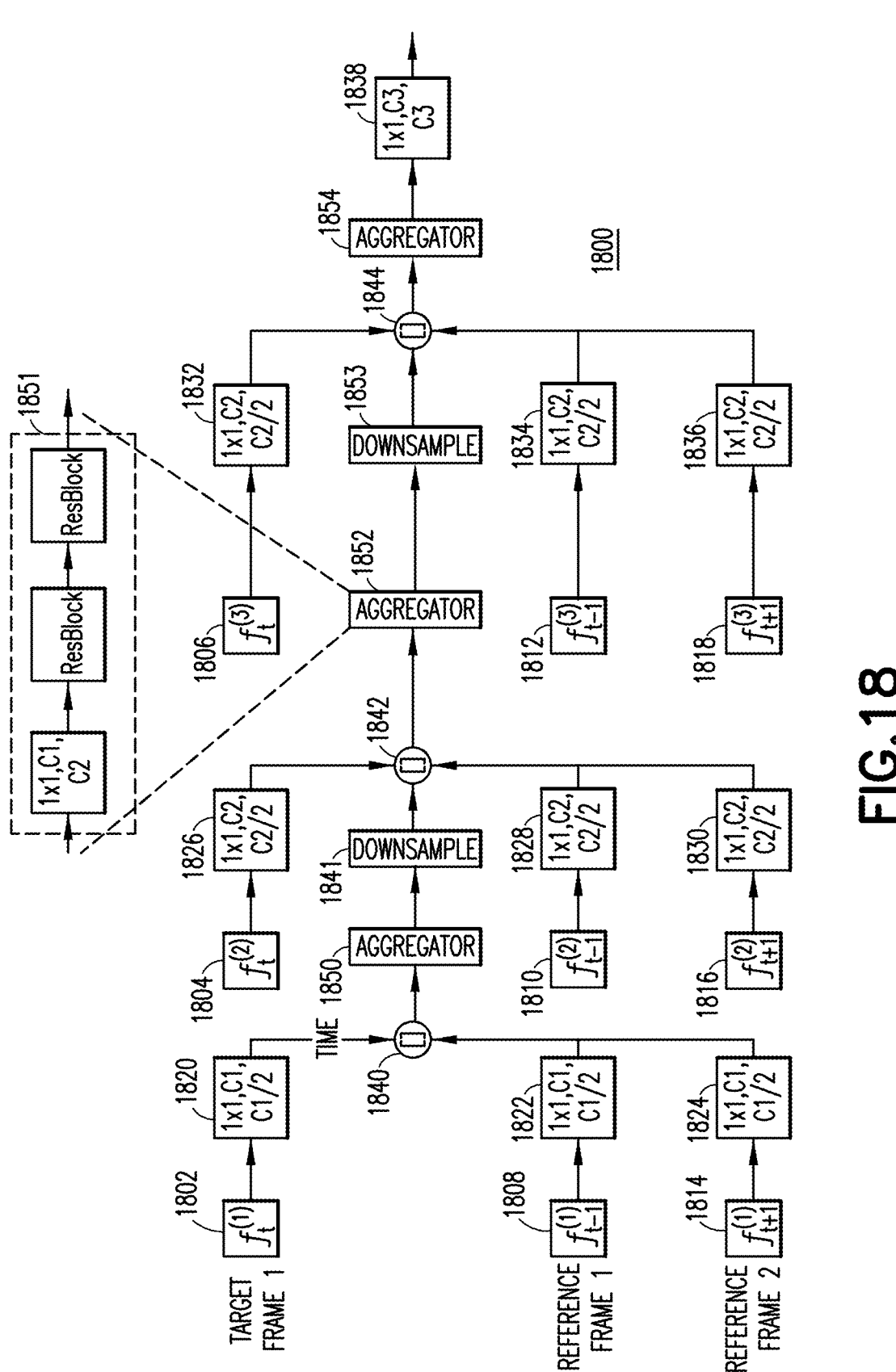
FIG. 18 illustrates an implementation of a 3-scale bridge network, in accordance with an embodiment.

Now referring to FIG. 18, it illustrates an implementation of a 3-scale bridge network 1800, in accordance with an embodiment. Inputs to the bridge network are features in 3 scales 1802, 1804 and 1806 generated from target frame by the feature pyramid network block or circuit 1710, features in 3 scales 1808, 1810 and 1812 generated from reference frame 1 by the feature pyramid network block or circuit 1708, and features in 3 scales 1814, 1816 and 1818 are generated from reference frame 2 by the feature pyramid network block or circuit 1712. At the first scale, features 1802, 1808 and 1814 are transformed by convolution blocks or circuits 1820, 1822 and 1824, where the text in the blocks are in the format of "[kernel size]×[kernel size], [input channels],[output channels]", for example, "1×1,C1,C1/2" indicates a 2D convolution operation using a one-by-one kernel on a input tensor with C1 number of channels and outputting a tensor with C1/2 number of channels. The transformed features are concatenated by a concatenation block or circuit 1840 and passed to an aggregator block or circuit 1850. An aggregator can be implemented by a deep convolutional neural network, for example, a deep convolution neural network 1851. At scale 2, the output of the aggregator block or circuit 1850 is first downsampled by a downsample block or circuit 1841. The downsample block or circuit 1841 may be implemented by a pooling operation or a convolution operation with a stride greater than 1. The second scale features of the target frame and reference frames 1804, 1810, and 1816 are transformed by convolution blocks or circuits 1826, 1828, and 1830; and concatenated by a concatenation block or circuit 1842 together with the output of a downsample block or circuit 1841. The concatenated features are given to an aggregator block or circuit 1852 to generate the output of the second scale. At the third scale, the procedure is similar to the process at the second scale. At scale 3, the output of the aggregator 1852 is first downsampled by a downsample block or circuit 1853. A downsample block can be implement by a pooling operation or a convolution operation with a stride greater than 1. Similar to the second scale, the third scale features of the target frame and reference frames 1806, 1812, and 1818 are transformed by convolution blocks 1832, 1834, and 1836; and concatenated by concatenation block or circuit 1844 together with the output of downsample block 1853. The concatenated features are given to an aggregator block or circuit 1854 to generate the output of the third scale. The output of the third scale is transformed by the convolution operator or circuit 1838 to generate the final output of the bridge network.

Reference Frames as Context to Probability Model

Another example embodiment comprises providing features extracted from reference frames, as extra context information for the probability model used in the entropy model. A probability model estimates the probability distribution of the latent representation to be compressed. The accuracy of the estimation directly affects the compression performance By giving auxiliary features as context to the probability model, the performance of the estimation can be significantly improved. In this embodiment, features from the two reference frames are generated by using a feature pyramid net and the concatenated features as the context is used for the distribution estimation.

Temporal Information as Input to the System

Still another embodiment comprises providing the temporal information of the references frame(s), e.g. the temporal distance between the reference frame and the target frame, as an extra input of the encoder, the decoder and the probability model. The temporal distance to the target frame indicates the relevance level of the reference frame and helps the motion estimation. The temporal distance can be an integer that represents the frame distance or a float number that is calculated from the frame distance and the frame per second (FPS) value of the input video. In this embodiment, a planar tensor is constructed with the same spatial dimension of the reference frame where all elements of the planar tensor are assigned the value of the temporal distance. The generated planar tensor is then appended to the reference frame as an extra channel. A sign is used to indicate whether the reference frame is before or after the target frame. Other suitable method for providing the temporal information to the one or more neural networks of the inter-codec may be considered, and the proposed embodiments are not limited by which method was used. Also, the temporal information may be provided in other forms than the temporal distance, such as the temporal level.

A reference frame with the same temporal information may be given to the two reference branches, when the proposed system is used for P frame compression, where only one reference frame is available.

Intra Frames for Enhancing the Frame Prediction

A still another embodiment, comprises a method for effectively exploiting the high-quality information of intra-coded frames for enhancing the reconstruction of B-predicted frames. For a video compression sequence, the intra-coded frames usually provide better quality compared to others. In one example, when predicting a B frame from two reference frames, two temporary versions of the B frame are predicted, and these two temporary versions of the B frame are then combined by a combiner module or combiner NN in order to obtain the final prediction for the B frame and adding this to the residual, as described in 'Detailed architecture of the inter-codec' section. In another embodiment, information about the intra frames as extra inputs is provided to the combiner NN.

Figure 19:
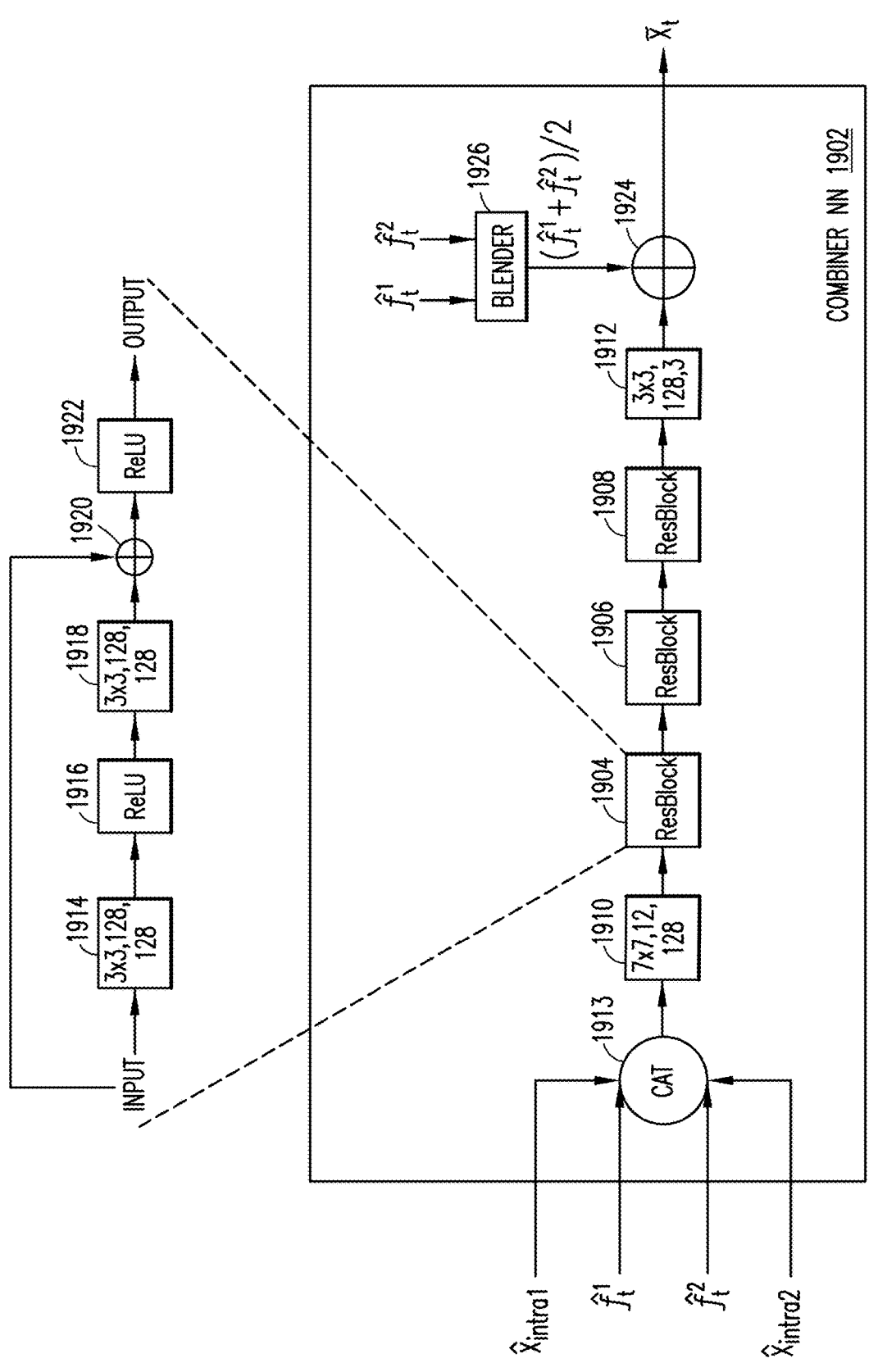
FIG. 19 illustrates an architecture for enhancing frame prediction, in accordance with an embodiment.

Referring now to FIG. 19, it illustrates an architecture for enhancing the frame prediction, in accordance with an embodiment. As shown in FIG. 19, the combiner NN 1902 comprises one or more residual blocks (ResBlock) or circuits, e.g. 3 residual blocks or circuits 1904, 1906, and 1908; a block 1910; and a block 1912 (may also be referred to as last layer 1912). Two temporary B frames $$\hat{f}_t^1, \hat{f}_t^2$$

and two intra frames $\hat{x}_{intra1}$, $\hat{x}_{intra2}$ are concatenated, by the concatenation block or circuit 1913, as an input to the combiner NN 1902. The block 1910 "7×7, 12, 128" is a convolutional layer with kernel size equal to 7 by 7, number of input channels equal to 12, and number of output channels equal to 128. The block 1912 "3×3, 128, 3" is a convolutional layer with kernel size equal to 3 by 3, number of input channels equal to 128, and number of output channels equal to 3. Each ResBlock or circuits may comprise one or more convolutional layers, one or more non-linear activation functions such as Rectified Linear Unit (ReLU), and other layer types. In the example in FIG. 19, each ResBlock comprises a convolutional layer 1914 with kernel size equal to 3×3, 128 input channels, 128 output channels; a ReLU non-linear activation function 1916; a convolutional layer 1918 with kernel size equal to 3×3, 128 input channels, 128 output channels, a summation operation block or circuit 1920; and a ReLU non-linear activation function 1922. The values for kernel size, number of input channels, number of output channels, and the specific architecture of the combiner NN shown in FIG. 19 are an example, and other suitable values may be used. The two temporary B frames $$\hat{f}_t^1, \hat{f}_t^2$$

are blended, by a blender block or circuit 1926 to form a blended B frame, for example, by performing a linear combination of $$\hat{f}_t^1, \hat{f}_t^2.$$

The last layer 1912 of the combiner NN 1902 outputs an estimate of the residual between, for e.g., the ground-truth B frame and the blended B frame. The output of the last layer 1912 of the combiner NN 1902 is added to the blended B frame by performing the addition operation 1924, and the result of this addition operation 1924 is the final prediction of the target frame $\tilde{x}_t$. By using the reconstructed intra-coded frames as additional inputs, the combiner NN 1902 may output a final prediction of the target frame $\tilde{x}_t$ which has enhanced details with respect to when not using the intra frames as additional inputs.

In one embodiment, instead of (or in addition to) providing the intra frames as additional inputs to the combiner NN, the latent representations of the intra frames may be provided as additional inputs to the combiner NN. The latent representations of the intra frames may first need to be reshaped or be processed by one or more layers of a neural network before providing them as additional inputs to the combiner NN.

In another embodiment, one intra frame and/or the latent representation of one intra frame are provided as additional inputs to the combiner NN. The choice of which intra frame is considered may depend on the distance between the intra frame and the B frame that is being predicted. For example, the intra frame which is closest to the B frame may be considered.

Resetting the Hidden State of the RNN

Whenever a RNN is used to model the temporal context, prior to feeding a frame to the RNN for context modelling, a distance of that frame encoded is compared, by some NN, with the holistic representation of the last encoded frame. Such holistic representation is obtained by same NN that encodes current frame and stored in memory. When the distance is large enough, we reset the hidden state of the RNN. The metric of the distance could be cosine distance between vectors or any other proper distance measure. In case of cosine distance if the distance is greater than T=0.5, reset is performed. The value of T could be optimized as a hyper parameter during training.

FIG. 20 is an example apparatus 2000, which may be implemented in hardware, configured to implement inter-codec model or architecture to encode or decode a media frame, based on the examples described herein. The apparatus 2000 comprises at least one processor 2002, at least one non-transitory memory 2004 including computer program code 2005, wherein the at least one memory 2004 and the computer program code 2005 are configured to, with the at least one processor 2002, cause the apparatus to implement an inter-codec model or architecture to encode or decode a media frame 2006, based on the examples described herein. The apparatus 2000 optionally includes a display 2008 that may be used to display content during rendering. The apparatus 2000 optionally includes one or more network (NW) interfaces (I/F(s)) 2010. The NW I/F(s) 2010 may be wired and/or wireless and communicate over the Internet/other network(s) via any communication technique. The NW I/F(s) 2010 may comprise one or more transmitters and one or more receivers. The N/W I/F(s) 2010 may comprise standard well-known components such as an amplifier, filter, frequency-converter, (de)modulator, and encoder/decoder circuitry(ies) and one or more antennas.

The apparatus 2000 may be a remote, a virtual or a cloud apparatus. The apparatus 2000 may be either a coder or a decoder, or both a coder and a decoder. The at least one memory 2004 may be implemented using any suitable data storage technology, such as semiconductor based memory devices, flash memory, magnetic memory devices and systems, optical memory devices and systems, fixed memory and removable memory. The at least one memory 2004 may comprise a database for storing data. The apparatus 2000 need not comprise each of the features mentioned, or may comprise other features as well. The apparatus 2000 may correspond to or be another embodiment of the apparatus 50 shown in FIG. 1 and FIG. 2, or any of the apparatuses shown in FIG. 3. The apparatus 2000 may correspond to or be another embodiment of the apparatuses shown in FIG. 24, including UE 110, RAN node 170, or network element(s) 190.

FIG. 21 illustrates an example method 2100 for encoding or decoding one or more media frames for at least one neural network, in accordance with an embodiment. At 2102, the method includes encoding or decoding one or more media frames for at least one neural network. At 2104, the method includes wherein an inter-frame codec is applied to at least one media frame of the one or more media frames. At 2106, the method includes wherein a first decoded reference frame and a second decoded reference frame refer to reference frames for the at least one media frame.

In an embodiment, the at least one media frame include an index 'i' that is not a multiple of an intra-frame codec period. In another embodiment, the first decoded reference frame comprises an index 'i−k' and the second decoded reference frame comprises an index 'i+m'. In yet another embodiment, 'i', 'k', and 'm' includes integer numbers, and wherein 'k' and 'm' are selected based on a temporal level of a bidirectionally predicted frame with the index 'i'.

FIG. 22 illustrates another example method 2200 for encoding or decoding one or more media frames for at least one neural network, in accordance with another embodiment. At 2202, the method includes encoding or decoding one or more media frames for at least one neural network. At 2204, the method includes, wherein an inter-frame codec is applied to at least one media frame of the one or more media frames. At 2206, the method includes, wherein a first decoded reference frame and a second decoded reference frame refer to reference frames for the at least one media frame. At 2208, the method includes, wherein a motion estimation is performed at a decoder side based on an implicit motion information provided by an encoder.

In an embodiment, the at least one media frame include an index 'i' that is not a multiple of an intra-frame codec period. In another embodiment, the first decoded reference frame comprises an index 'i–k' and the second decoded reference frame comprises an index 'i+m'. In yet another embodiment, 'i', 'k', and 'm' includes integer numbers, and wherein 'k' and 'm' are selected based on a temporal level of a bidirectionally predicted frame with the index 'i'.

FIG. 23 illustrates yet another example method 2300 for encoding or decoding one or more media frames for at least one neural network, in accordance with yet another embodiment. At 2302, the method includes receiving a plurality of temporary frames and a plurality of intra frames. At 2304, the method includes concatenating the plurality of temporary frames and the plurality of intra frames. At 2306, the method includes blending the plurality of temporary frames to form a blended frame. At 2308, the method includes estimating a residual between an uncompressed target frame (e.g., a ground-truth frame) and the blended frame. At 2310, the method includes adding the residual and the blended frame to generate a final prediction of the target frame.

Figure 24:
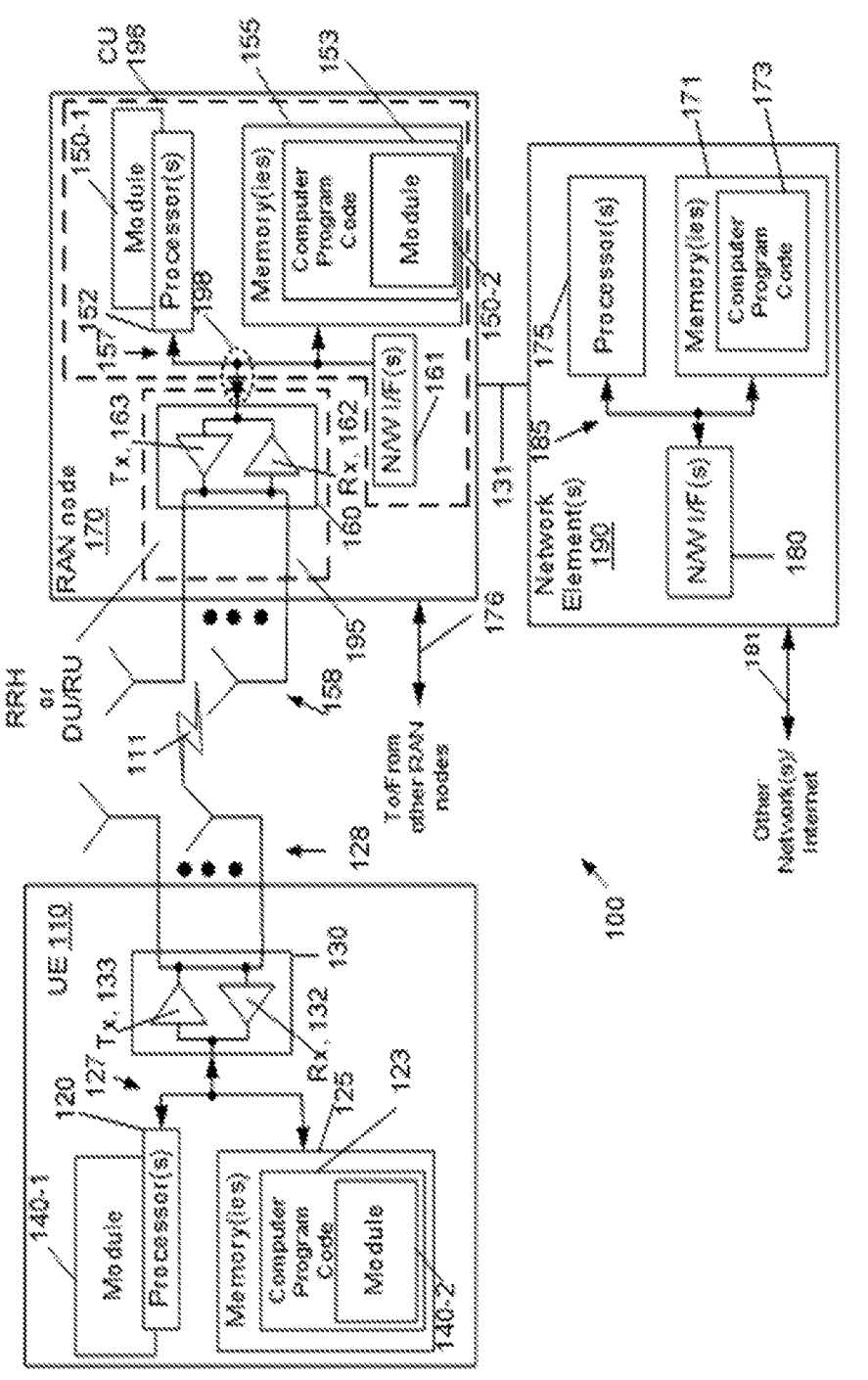
FIG. 24 is a block diagram of one possible and non-limiting system in which the example embodiments may be practiced.

Referring to FIG. 24, this figure shows a block diagram of one possible and non-limiting example in which the examples may be practiced. A user equipment (UE) 110, radio access network (RAN) node 170, and network element (s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting radio resource control (RRC), SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, for example, as part of a RU, but some examples of this may have the transceiver 160 as part of a separate RU, for example, under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, for example, link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (for example, a central unit (CU), gNB-CU) of the RAN node 170 to the RRH/DU 195. Reference 198 also indicates those suitable network link(s).

It is noted that description herein indicates that 'cells' perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (for example, the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, for example, an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element (s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

One or more of modules 140-1, 140-2, 150-1, and 150-2 may be configured to implement inter-codec model or architecture to encode or decode a media frame. Computer program code 173 may also be configured to implement inter-codec model or architecture to encode or decode a media frame.

As described above, FIGS. 21, 22, and 23 include a flowcharts of an apparatus (e.g. 50, 100, 604, 700, or 2000), method, and computer program product according to certain example embodiments. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory (e.g. 58, 125, 704, or 2004) of an apparatus employing an embodiment of the present invention and executed by processing circuitry (e.g. 56, 120, 702 or 2002) of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowchart of FIGS. 21, 22, and 23. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

In the above, some example embodiments have been described with reference to an SEI message or an SEI NAL unit. It needs to be understood, however, that embodiments can be similarly realized with any similar structures or data units. Where example embodiments have been described with SEI messages contained in a structure, any independently parsable structures could likewise be used in embodiments. Specific SEI NAL unit and a SEI message syntax structures have been presented in example embodiments, but it needs to be understood that embodiments generally apply to any syntax structures with a similar intent as SEI NAL units and/or SEI messages.

In the above, some embodiments have been described in relation to a particular type of a parameter set (namely adaptation parameter set). It needs to be understood, however, that embodiments could be realized with any type of parameter set or other syntax structure in the bitstream.

In the above, some example embodiments have been described with the help of syntax of the bitstream. It needs to be understood, however, that the corresponding structure and/or computer program may reside at the encoder for generating the bitstream and/or at the decoder for decoding the bitstream.

In the above, where example embodiments have been described with reference to an encoder, it needs to be understood that the resulting bitstream and the decoder have corresponding elements in them. Likewise, where example embodiments have been described with reference to a decoder, it needs to be understood that the encoder has structure and/or computer program for generating the bitstream to be decoded by the decoder.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Accordingly, the description is intended to embrace all such alternatives, modifications and variances which fall within the scope of the appended claims. Although specific terms are employed herein, they are used in a generic and descriptive sense only and not for purposes of limitation.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

References to a 'computer', 'processor', etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device such as instructions for a processor, or configuration settings for a fixed-function device, gate array or programmable logic device, and the like.

As used herein, the term 'circuitry' may refer to any of the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This description of 'circuitry' applies to uses of this term in this application. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

What is claimed is:

1. An apparatus comprising:

at least one processor; and at least one memory storing instructions that, when executed by the at least one processor, cause the apparatus at least to perform:

encode or decode one or more media frames based on at least one neural network;

wherein an inter-frame codec is applied to at least one media frame of the one or more media frames;

wherein the at least one media frame is referred to as a target media frame;

wherein a first decoded reference frame and a second decoded reference frame refers to reference frames for the target media frame; and wherein the inter-frame codec comprises:

an inter-frame encoder block or circuit, wherein the inter-frame encoder block or circuit is caused to encode the target media frame and obtain an encoded target frame; and an inter-frame decoder block or circuit to generate a decoded target frame based on the encoded target frame;

generate a first set of multi-scale features based on the first decoded reference frame, the second decoded reference frame, and the target media frame;

perform at least one of aggregating or converting multi-scale features of the first set of multi-scale features to a latent representation, wherein the latent representation comprises information about motion between the target media frame and one or more reference frames;

determine a first temporal level for the first decoded reference frame;

wherein the first temporal level determined for the first decoded reference frame is determined based on the first decoded reference frame being temporally before the target media frame;

select a first index for the first decoded reference frame based on the first temporal level determined for the first decoded reference frame;

determine a second temporal level for the second decoded reference frame;

wherein the second temporal level determined for the second decoded reference frame is determined based on the second decoded reference frame being temporally after the target media frame;

select a second index for the second decoded reference frame based on the second temporal level determined for the second decoded reference frame; and use the first index selected for the first decoded reference frame and the second index selected for the second decoded reference frame to encode or decode the target media frame;

wherein the target media frame comprises a bidirectionally predicted media frame.

2. The apparatus claim 1, wherein the apparatus further comprises one or more feature pyramid net blocks or circuits, and wherein the one or more feature pyramid net blocks or circuits are caused to generate the first set of multi-scale features based on the first decoded reference frame, the second decoded reference frame, and the target media frame.

3. The apparatus of the claim 2, wherein the apparatus further comprises a bridge net block or circuit, and wherein the bridge net block or circuit is caused to aggregate and/or convert the first set of multi-scale features to the latent representation, wherein the latent representation comprises information about motion-prediction residual.

4. The apparatus of claim 3, wherein the apparatus further comprises an entropy codec block or circuit, and wherein the entropy codec block or circuit comprises an entropy encoder block or circuit that is caused to quantize, compress and convert the latent representation to a compressed bitstream and wherein the entropy codec block or circuit further comprises an entropy decoder block or circuit that is caused to decompress and dequantize the compressed bitstream to generate a reconstructed latent representation.

5. The apparatus of claim 4, wherein the apparatus further comprises at least one entropy feature pyramid net block or circuit, and wherein the at least one entropy feature pyramid net block or circuit is caused to generate one or more features from the first decoded reference frame and the second decoded reference frame, wherein the one or more features are used to enhance a context, wherein the context is used by a probability model to obtain an estimated probability distribution of the latent representation, and wherein the estimated probability distribution is used by the entropy codec block or circuit.

6. The apparatus of claim 4, wherein the apparatus further comprises a feature pyramid decoder, and wherein the feature pyramid decoder is caused to generate a second set of multi-scale features and a residual output based on the reconstructed latent representation.

7. The apparatus of claim 6, wherein the apparatus further comprises a first motion estimation block or circuit and a second motion estimation block or circuit, wherein the first motion estimation block or circuit is caused to estimate a first motion based at least on the second set of multi-scale features or on features extracted from the first decoded reference frame to obtain a first estimated motion, and wherein the second motion estimation block or circuit is caused to estimate a second motion based at least on the second set of multi-scale features or on features extracted from a second decoded reference frame to obtain a second estimated motion.

8. The apparatus of claim 7, wherein the apparatus further comprises one or more frame prediction blocks or circuits, and wherein the one or more frame prediction blocks or circuits are caused to use the first estimated motion and the second estimated motion to warp a first reference frame to generate a first prediction of the target media frame and a second reference frame to generate a second prediction of the target media frame.

9. The apparatus of claim 8, wherein the apparatus further comprises a combiner block or circuit, and wherein the combiner block or circuit is caused to generate a final prediction of the target media frame based at least on one or more of the following: the first prediction of the target media frame, the second prediction of the target media frame, one or more decoded intra frames, a latent representation of one or more intra frames, or the residual output.

10. The apparatus claim 1, wherein a distance between the target media frame and one of the first decoded reference frame or the second decoded reference frame, or information derived from the distance between the target media frame and one of the first decoded reference frame or the second decoded reference frame, is input to one or more neural networks of the inter-frame encoder block or circuit and/or the inter-frame decoder block or circuit.

11. A method comprising:

encoding or decoding one or more media frames based on at least one neural network;

wherein an inter-frame codec is applied to at least one media frame of the one or more media frames;

wherein the at least one media frame is referred to as a target media frame;

wherein a first decoded reference frame and a second decoded reference frame refers to reference frames for the target media frame; and wherein the inter-frame codec comprises:

an inter-frame encoder block or circuit, wherein the inter-frame encoder block or circuit is caused to encode the target media frame and obtain an encoded target frame; and an inter-frame decoder block or circuit to generate a decoded target frame based on the encoded target frame;

generating a first set of multi-scale features based on the first decoded reference frame, the second decoded reference frame, and the target media frame;

performing at least one of aggregating or converting multi-scale features of the first set of multi-scale features to a latent representation, wherein the latent representation comprises information about motion between the target media frame and one or more reference frames;

determining a first temporal level for the first decoded reference frame;

wherein the first temporal level determined for the first decoded reference frame is determined based on the first decoded reference frame being temporally before the target media frame;

selecting a first index for the first decoded reference frame based on the first temporal level determined for the first decoded reference frame;

determining a second temporal level for the second decoded reference frame;

wherein the second temporal level determined for the second decoded reference frame is determined based on the second decoded reference frame being temporally after the target media frame;

selecting a second index for the second decoded reference frame based on the second temporal level determined for the second decoded reference frame; and using the first index selected for the first decoded reference frame and the second index selected for the second decoded reference frame to encode or decode the target media frame;

wherein the target media frame comprises a bidirectionally predicted media frame.

12. The method of claim 11, wherein the latent representation comprises information about motion-prediction residual.

13. The method of claim 12 further comprising:

quantizing, compressing and converting the latent representation to a compressed bitstream; and decompressing and dequantizing the compressed bitstream to generate a reconstructed latent representation.

14. The method of claim 13 further comprising generating one or more features from the first decoded reference frame and the second decoded reference frame, wherein the one or more features are used to enhance a context, and wherein the context is used by a probability model to obtain an estimated probability distribution of the latent representation, and wherein the estimated probability distribution is used by an entropy codec block or circuit.

15. The method of claim 13 further comprising generating a second set of multi-scale features and a residual output based on the reconstructed latent representation.

16. The method of claim 15 further comprising:

estimating a first motion based at least on the second set of multi-scale features or on features extracted from the first decoded reference frame to obtain a first estimated motion; and estimating a second motion based at least on the second set of multi-scale features or on features extracted from a second decoded reference frame to obtain a second estimated motion.

17. The method of claim 16 further comprising:

using the first estimated motion and the second estimated motion to warp a first reference frame to generate a first prediction of the target media frame and a second reference frame to generate a second prediction of the target media frame; and generating a final prediction of the target media frame based at least on one or more of the following: the first prediction of the target media frame, the second prediction of the target media frame, one or more decoded intra frames, a latent representation of one or more intra frames, or the residual output.

18. The method claim 11, wherein a distance between the target media frame and one of the first decoded reference frame or the second decoded reference frame, or information derived from the distance between the target media frame and one of the first decoded reference frame or the second decoded reference frame, is input to one or more neural networks of the inter-frame encoder block or circuit and/or the inter-frame decoder block or circuit.

* * * * *